US006424727B1

(12) United States Patent
Musgrave et al.

(10) Patent No.: US 6,424,727 B1
(45) Date of Patent: Jul. 23, 2002

(54) SYSTEM AND METHOD OF ANIMAL IDENTIFICATION AND ANIMAL TRANSACTION AUTHORIZATION USING IRIS PATTERNS

(75) Inventors: Clyde Musgrave, Frisco, TX (US); James L. Cambier, Medford, NJ (US)

(73) Assignee: Iridian Technologies, Inc., Moorestown, NJ (US)

( * ) Notice: Subject to any disclaimer, the term of this patent is extended or adjusted under 35 U.S.C. 154(b) by 0 days.

(21) Appl. No.: 09/436,525

(22) Filed: Nov. 9, 1999

Related U.S. Application Data

(63) Continuation-in-part of application No. 09/310,302, filed on May 12, 1999, which is a continuation-in-part of application No. 09/199,369, filed on Nov. 25, 1998.

(51) Int. Cl.[7] .................................................. G06K 9/00
(52) U.S. Cl. ........................................ 382/117; 382/116
(58) Field of Search ............................... 382/110, 117, 382/115, 116; 348/78; 351/206, 209, 218, 221

(56) References Cited

U.S. PATENT DOCUMENTS

| 4,641,349 A | * | 2/1987 | Flom ........................... 351/206 |
| 4,876,608 A | | 10/1989 | Eaton ........................... 358/443 |
| 5,109,390 A | | 4/1992 | Gilhousen et al. ............. 375/1 |
| 5,151,583 A | | 9/1992 | Tokunaga et al. ......... 250/201.2 |
| 5,175,758 A | | 12/1992 | Levanto et al. ............... 379/57 |
| 5,291,560 A | | 3/1994 | Daugman ..................... 382/2 |
| 5,392,297 A | | 2/1995 | Bell et al. .................. 371/22.6 |
| 5,404,163 A | | 4/1995 | Kubo ......................... 348/142 |
| 5,448,622 A | | 9/1995 | Huttunen ..................... 379/58 |
| 5,485,486 A | | 1/1996 | Gilhousen et al. .......... 375/205 |
| 5,572,596 A | | 11/1996 | Wildes et al. ............... 382/117 |
| 5,719,950 A | | 2/1998 | Osten et al. ................ 382/115 |
| 5,751,260 A | | 5/1998 | Nappi et al. ................... 345/8 |

(List continued on next page.)

FOREIGN PATENT DOCUMENTS

| EP | 97302580.2 | 4/1997 |
| GB | 9611787.4 | 6/1996 |
| GB | 9621900.1 | 10/1996 |

OTHER PUBLICATIONS

IriScan, Inc. Webpage, printed from the internet on Aug. 6, 1999, 25 pages.
Sensar, Inc. Webpage, printed from the Internet on Aug. 10, 1999, 6 pages.
John Daugman Webpage, Cambridge University, Computer Laboratory, Cambridge, UK, printed from the Internet on Sep. 27, 28 and 29, 1999, 34 pages.

*Primary Examiner*—Bhavesh Mehta
(74) *Attorney, Agent, or Firm*—Woodcock Washburn LLP

(57) ABSTRACT

A system and method of identification of an animal based on features of the iris of an eye are disclosed. An image of the animal's eye is captured using an iris acquisition device that combines a camera, an optical system, an illumination source, and a viewing screen, preferably in one small, hand-held device. A biometric template based on the features of the animal's iris is extracted from the captured iris image. The identity of the animal is determined by comparing the obtained biometric template with a previously-obtained and stored biometric template, collected under conditions which permit independent verification of identity, and stored in a database along with identification information. A system and method of animal transaction authorization is also provided wherein the identification of an animal is authenticated, the identification of a person in the animal identity and tracking chain is authenticated, and an animal transaction is authorized of based on a match between the identity of the person in the animal identity and tracking chain and the identity of the animal. Preferably, the animal and person identification is accomplished using iris recognition techniques, and the animal and person identities are keyed to one another in a database to facilitate the matching between the animal and the person.

15 Claims, 11 Drawing Sheets

U.S. PATENT DOCUMENTS

| | | | |
|---|---|---|---|
| 5,751,836 A | | 5/1998 | Wildes et al. ............... 382/117 |
| 5,790,957 A | | 8/1998 | Heidari ....................... 455/553 |
| 6,081,607 A | * | 6/2000 | Mori et al. .................. 382/110 |
| 6,144,754 A | * | 11/2000 | Okano et al. ............... 382/117 |
| 6,215,891 B1 | * | 4/2001 | Suzaki et al. ............... 382/117 |
| 6,229,905 B1 | * | 5/2001 | Suzaki ....................... 382/110 |
| 6,285,780 B1 | * | 9/2001 | Yamakita et al. ........... 382/110 |
| 6,289,113 B1 | * | 9/2001 | McHugh et al. ............ 382/117 |

\* cited by examiner

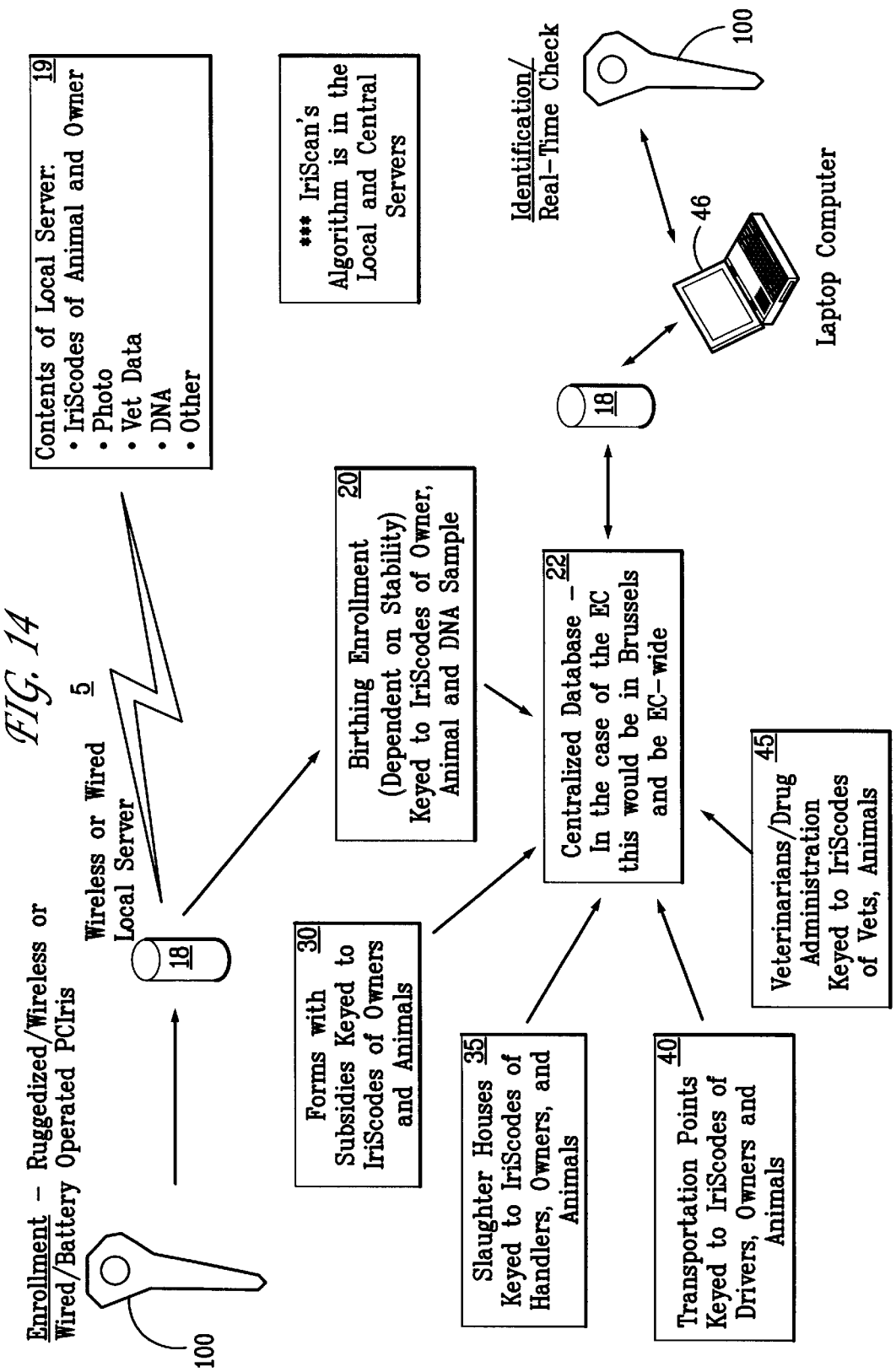

SYSTEM AND METHOD OF ANIMAL IDENTIFICATION AND ANIMAL TRANSACTION AUTHORIZATION USING IRIS PATTERNS

RELATED APPLICATION DATA

The present application is a continuation-in-part application of U.S. patent application Ser. No. 09/310,302, which was filed May 12, 1999, which is a continuation-in-part application of U.S. patent application Ser. No. 09/199,369, which was filed Nov. 25, 1998.

FIELD OF THE INVENTION

The present invention relates in general to identification of physical characteristics of an animal and a human being. More particularly, the present invention relates to the identification of an animal and/or a person involved in an animal transaction using iris recognition.

BACKGROUND OF THE INVENTION

Animal identification has been in use for hundreds of years. The oldest form, acquaintance and recognition of animals by humans, is still in use. Newer techniques, such as ear tags, branding, and tattoos have been widely used but are susceptible to loss, illegibility, and mutilation concerns. DNA has been used, but this method is defeated by cloning. The newest methods are based on radio frequency identification (RFID) devices. These RFID devices typically include passive RF transponders that can be incorporated into collars, ear tags, injectible microcapsules, and rumen boluses. However, external RF devices are susceptible to theft, tampering, and mutilation while internal devices are intrusive and hard to maintain. Also, biological methods of identification have been proposed, such as antibody fingerprinting, which is one of the few techniques that can be used after the animal is slaughtered as well as before.

The requirements for animal identification vary depending on the application. Identification at or near birth is desirable for genetic and performance monitoring. For most other applications, such as animal health and food safety, it is sufficient to identify the animal at weaning or prior to its leaving the farm of origin.

In addition, fraud and deception in animal transactions and the theft of rare or valuable animals results in losses to animal owners and increased insurance claims. The costs of theses losses are passed on to consumers in the form of higher prices for animals and animal products. Automatic animal identification has been identified as a critical technology that can be used to meet industry needs for various animal transactions, including value based marketing, genetic improvement, breeding, animal tracking, health, disease control, and food safety. Additional, government requirements in some countries include population monitoring and certification to validate farm subsidies paid on a per-animal basis. For example, the requirement for accurate animal identification within the food industry is broad-based, and includes large food animals such as cattle, sheep, and swine. In addition, identification technology applicable to high-value animals, such as thoroughbred horses and racing dogs, is needed to prevent theft and fraud, and facilitate interstate and international movement of these animals in connection with equestrian events, competition, racing, and trading. Also, the authentication of animals used in breeding is needed to avoid fraud and deception and to ensure that the desired traits of an animal are passed on to the offspring.

In addition to identifying the animal, in certain animal transactions it is also desirable to positively identify persons involved in the animal identity and tracking chain, such as an owner, a shipper and transporting personnel, buyers and sellers, food processing personnel, veterinarians and animal care takers, etc. Currently, there is no reliable system for positively identifying an animal and at the same time also identifying the person in the identity and tracking chain who proposes to have an interest in or control over the animal. Matching the animal to its rightful owner or appointed guardian helps provide certainty in animal transactions and to ensure the safe and efficient transfer of animals between interested parties in order to minimize fraud, theft, uncertainty, and other risks normally present during most animal transactions.

Various technologies are used for uniquely identifying a person in accordance with an examination of particular attributes of either the person's interior or exterior eye. One of these technologies involves the visual examination of the particular attributes of the exterior of the iris of at least one of the person's eyes. The iris of an eye has random patterns of striations, ciliary processes, crypts, rings, furrows and other features which had been shown capable of generating highly unique biometric templates for identification purposes. In this regard, reference is made to U.S. Pat. No. 4,641,349, "Iris Recognition System", issued to Flom et al., and U.S. Pat. No. 5,291,560, "Biometric Personal Identification System Based on Iris Analysis", issued to Daugman. As made clear by these patents, the visible texture of a person's iris can be used to distinguish one person from another with great accuracy. Thus, iris recognition can be used for such purposes as controlling access to a secure facility or a bank automatic teller machine, for example. An iris recognition system involves the use of an imager to video image the iris of each person attempting access, and image processing means for comparing this iris video image with a reference iris image on file in a database.

Iris identification systems have been developed that are capable of collecting images of the iris of a person and processing them to produce biometric templates. These templates may be used to identify individual irises with extremely low error rates, on the order of 1 in $10^6$. The systems capture the iris images using stationary optical platforms that are often large, complex, and expensive. The systems are difficult to use with minimal cooperation of the subject being identified. As a result their usefulness in many applications is limited.

Although the art of iris recognition systems is well developed for humans, there remain some problems inherent in this technology, particularly the lack of a system and method for animal identification using iris recognition, as well as the lack of a system and method for using iris recognition for authorizing animal transactions with a high level of certainty in the validity and finality of the animal transaction. Therefore, a need exists for a recognition system and method that overcomes the drawbacks of the prior art.

SUMMARY OF THE INVENTION

The present invention is directed to a system and method for identification of animals based on features of the iris of the eye. An image of the eye is captured using an iris acquisition device that combines a camera, an optical system, an illumination source, and a viewing screen, preferably in one small, hand-held device. The illumination and imaging are capable of using visible and infrared light, preferably spanning a range of wavelengths from about 680 to about 800 nanometers. The viewing screen can be used to display the live image to an operator, who uses the displayed image to position and focus the device to obtain high quality images. Alternatively, automatic focusing features can be employed in capturing the images.

According to aspects of the invention, iris texture information is extracted from the image at multiple scales of analysis by a self-similar set of quadrature (2-D Gabor) bandpass filters defined in a dimensionless polar coordinate system. The sign of the projection of different parts of the iris onto these multi-scale filters determines each bit in a biometric code (e.g., an abstract 256-byte iris code). The resulting biometric code has fixed length and format, facilitating comparison of multiple codes at high speed using simple digital exclusive-or (XOR) logic. A similarity metric, the Hamming distance, is computed from any two biometric codes. The value of this metric positively confirms or disconfirms the identity of an individual animal by comparing its biometric code with a previously-obtained biometric template, collected under conditions which permit independent verification of identity, and stored in a database along with identification information.

The present invention is directed to a system and method of animal identification. The system can authenticate the claimed identity of an animal and identify an unknown animal by comparing a captured iris image on an animal to stored iris images in a database.

The present invention is also directed to a system and method of animal transaction authorization wherein the identity of one or more animals is authenticated, the identity of one or more persons in the animal identity and tracking chain is authenticated, and the identity of the person in the animal identity and tracking chain is matched to the identity of the animal prior to the authorization of an animal transaction. The animal and person identification is accomplished using the iris recognition techniques described herein, and the animal and person identities are keyed to, or associated with, one another in a database to facilitate the matching between the animal and the person.

In another embodiment within the scope of the present invention, the animal transaction is authorized based on the results of a comparison of a captured animal iris image to a stored animal iris image and based on the results of a comparison of a captured human iris image to a stored human iris image.

According to another aspect of the present invention, the stored animal iris template is keyed to, or associated with, the stored person iris template providing a pointer between the stored animal identification information and the stored person identification information.

In another embodiment within the scope of the present invention, a level of authority and entitlements are stored with or pointed to by one or more of the animal template and person template.

In another embodiment within the scope of the present invention, the authorization to complete the animal transaction and the level of authority and entitlements are based on one or more signals received from a controlling authority.

The present invention can be used to identify any animal or other creature having an eye with an iris. This would include almost all animals, reptiles, birds, fish, etc., including large food animals, such as cattle, cows, sheep, and swine; commercial animals, such as race horses and racing dogs; show animals, such as dogs; domestic animals, such as dogs and cats; rare or endangered animals; animals kept in zoos or on game preserves; work animals, such as horses, oxen, elephants; or any other animal whose identity is desired to be known and verified.

According to one aspect of the invention, an iris acquisition device is provided having a front surface for obtaining an image of an iris of an eye; a lens having an image plane disposed in front of the front surface of the iris acquisition device; a mirror disposed on a side of the lens opposite the iris acquisition device; an illuminator disposed along a side of the mirror; a memory for storing an iris image obtained by the iris acquisition device; a processor for extracting a template from the stored iris image; and a communications interface for transmitting the template to a central station.

According to another aspect of the invention, the iris acquisition device comprises a camera, and the mirror is a cold mirror. According to another aspect of the present invention, the iris acquisition device further comprises at least a visible indicator or an audible indicator to indicate when the image of the iris has been obtained. According to another aspect of the present invention, the iris acquisition device further comprises a focus assessment processor coupled to the visible indicator and/or the audible indicator.

According to another aspect of the present invention, a processor authorizes an animal transaction responsive to a signal received from a central station. In one preferred situation, the animal identification technique would provide a pointer into a proprietary, national or international database which allows for both premises and individual animal identification. Also, it is desirable to identify animals at an acceptable throughput (speed) and acceptable standoff distance together with the improved performance provided by iris recognition.

In a further embodiment within the scope of the present invention includes a method of authorizing an animal transaction responsive to a match between the identification of one or more animals and the identification of one or more persons comprising the steps of: storing image information of the iris of at least one animal's eye and at least one person's eye; illuminating an eye of an unidentified animal having an iris and an unidentified person having an iris; obtaining an image of the iris of the unidentified animal and the unidentified person; extracting an iris template from the obtained image, if the image is of sufficient quality; comparing the template of the obtained image with the stored image information to identify the unidentified animal and unidentified person; and authorizing the animal transaction responsive to a result of the step of comparing. The stored image information used for identification can be a code or template extracted from the iris image, and the comparison can be performed at a controlling authority, such as an animal service provider. The controlling authority can be centrally located or can include a plurality of remote local servers.

BRIEF DESCRIPTION OF THE DRAWINGS

The foregoing and other aspects of the present invention will become apparent from the following detailed description of the invention when considered in conjunction with the accompanying drawings. For the purpose of illustrating the invention, there is shown in the drawings an embodiment that is presently preferred, it being understood, however, that the invention is not limited to the specific methods and instrumentalities disclosed. In the drawings:

FIG. 14 is a block diagram of an exemplary system in accordance with the present invention.

DETAILED DESCRIPTION OF PREFERRED EMBODIMENTS

The present invention is directed to a system and method for identification of animals based on features of the iris of the eye. The present invention is also directed to a system and method of animal transaction authorization wherein the identification of an animal is authenticated, the identification of a person in the animal identity and tracking chain is authenticated, a match between the identity of the person in the animal identity and tracking chain and the identity of the animal is determined, and authorization to conduct an animal transaction is given based on the identification and the matching of the person to the animal. The animal and person identification is accomplished using iris recognition techniques. The animal and person identities are preferably keyed to, or associated with, one another in a database to facilitate the matching between the animal and the person. The database can have other information, such as, for example, other identification information, a specific level of authorization, specific authorized acts, entitlements, etc.

Figure 1:
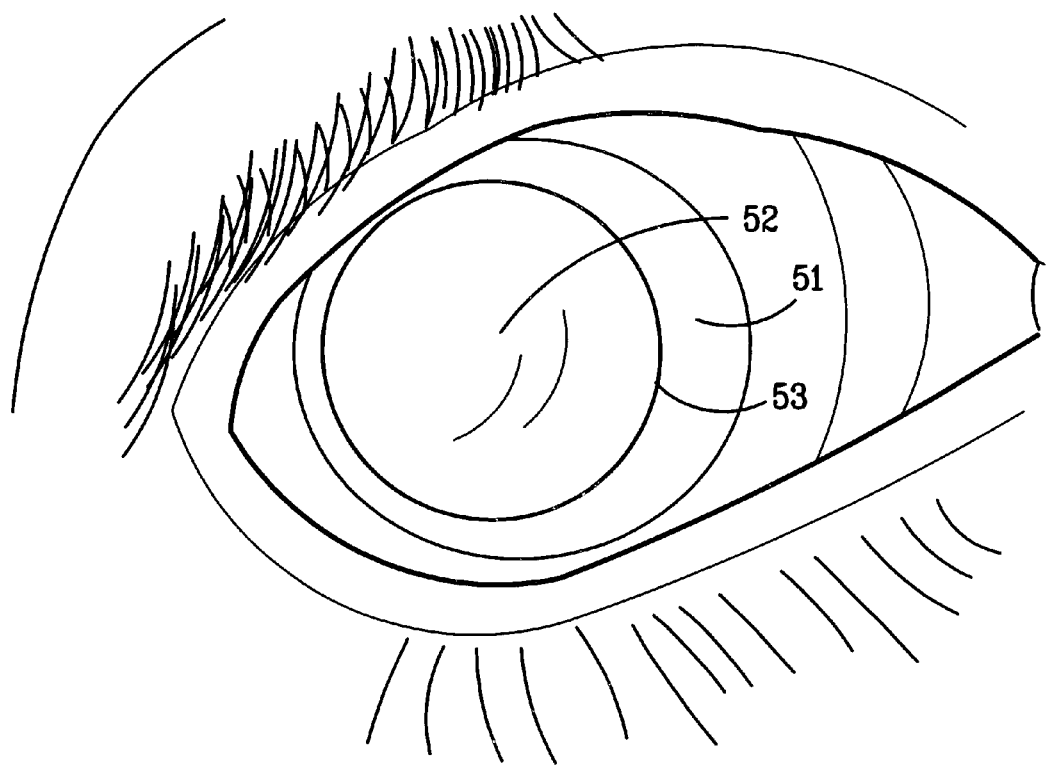
FIG. 1 is a schematic diagram of an exemplary iris and pupil of an animal eye, showing the major visible features.

FIG. 1 is a simplified drawing of an eye 50, showing some of the major visible features of the iris 51 and the pupil 52. As shown, eye 50 is a cattle's eye. The iris 51 may have any of a broad range of hues and may be irregularly pigmented, and pupil 52 is a light receptive opening which allows light to enter the eye and fall on the retina (not shown). Muscles in the iris 51 operate to increase and decrease the size of the pupil opening thereby regulating the amount of light that enters the eye 50 through the pupil 52.

In general, the iris 51 is characterized by texture information, including pigment related features, structural related features, as well as several features relating to the function of controlling the size of the pupil 52 that are visible from the exterior of the eye 50. The iris 51 of an eye 50 has random patterns of striations, ciliary processes, crypts, rings, furrows and other features which had been shown capable of generating highly unique iris images for human identification purposes. In addition, visible anomalies (not shown) may appear on the iris 51 due to growths, age, or trauma to the iris. Finally the shape of the interface 53 between the iris 51 and the pupil 52 is also a feature that is visible from the exterior of the eye 50. This interface defines the shape of the pupil 52 and is not necessarily round.

Preferably, iris texture information is extracted from the image at multiple scales of analysis by a self-similar set of quadrature (2-D Gabor) bandpass filters defined in a dimensionless polar coordinate system. The sign of the projection of different parts of the iris onto these multi-scale filters determines each bit in a biometric code (e. g., an abstract 256-byte iris code). The resulting biometric code has fixed length and format, facilitating comparison of multiple codes at high speed using simple digital exclusive-or (XOR) logic. A similarity metric, the Hamming distance, is computed from any two biometric codes. The value of this metric positively confirms or disconfirms the identity of an individual animal by comparing its biometric code with a previously-obtained biometric template, collected under conditions which permit independent verification of identity, and stored in a database along with identification information.

The present invention uses an imager, preferably a compact handheld imaging apparatus, to capture high-quality iris images. Preferably, the imager has sensors and indicators which assist the human operator in aligning and focusing the device. The imager also automatically captures the image when proper positioning is achieved. The same, or different, imaging apparatus can be used for the identification of human beings, animals, or any other creature that has an eye and an iris.

Figure 2:
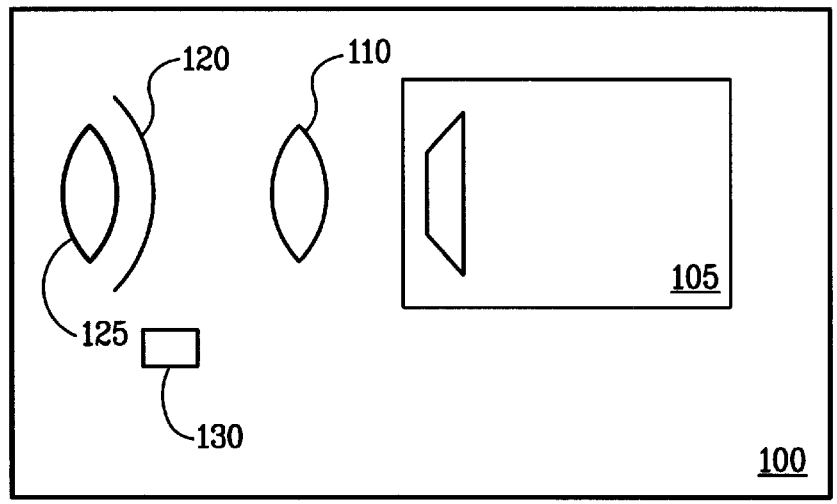
FIG. 2 is a schematic diagram of an exemplary iris imager in accordance with the present invention.

FIG. 2 illustrates a preferred embodiment of a handheld imager 100 that can be used with the present invention. The exemplary handheld, non-invasive, non-contacting iris imager comprises iris acquisition device 105, an imaging lens 110, a mirror 120, an optional diopter correction lens 125, and an illuminator 130. The imaging system 100 can be capable of both infrared and visible imaging and illumination. The imager 100 is preferably powered by a standard battery supply. Alternatively, the imager can be a stationary device (not shown) permanently mounted to a fixed structure or station (not shown).

The iris acquisition device 105 is preferably a conventional solid state video camera, such as a charged coupled device (CCD) or complementary metal oxide semiconductor (CMOS) device. A preferred camera is a 1/3 inch format, monochrome CCD board camera, such as Computar Model EM200. Preferably, the video camera 105 is sensitive to light of wavelengths in the range of about 400 nanometers to about 1100 nanometers, and is positioned so that its front surface coincides with the image plane of the lens 110 in front of it. In the preferred embodiment, the object plane of the lens is approximately 89 mm in front of the lens 110. More preferably, the lens 110 is an optical lens with approximately 14.2 mm focal length.

The mirror 120, preferably a concave cold mirror having a radius of curvature of about 276 mm, is disposed on the side of the lens 110 opposite the video camera 105 and creates a magnified virtual image of the iris behind the mirror 120. In the preferred embodiment, the mirror 120 reflects visible light with wavelengths in the range of about 400 to about 700 nanometers, and passes light having longer wavelengths, such as those in the range of about 700 to about 900 nanometers.

The illuminator 130 is positioned just outside the edge of the cold mirror 120 and is used to illuminate the iris of the subject being identified. The preferred illuminator 130 emits light having wavelengths of about 680 to about 900 nanometers. Preferably, the illuminator 130 is a miniature quartz halogen or krypton gas bulb operating at approximately 1 watt.

The imager acquires images of an iris with sufficient clarity, focus, and size for use with conventional image processing and comparison routines, preferably in less than about 3 seconds. A preferred image processing and comparison routine is described in U.S. Pat. No. 5,291,560, "Biometric Personal Identification System Based on Iris Analysis", issued to Daugman, and commonly assigned with the present invention to IriScan Inc., and incorporated herein by reference. However, any processing and comparison technique can be used with the image that is acquired at the imager, such as the image pixel correlation technique described in U.S. Pat. No. 5,572,596, "Automated, Non-Invasive Iris Recognition System and Method", issued to Wildes et al. and the techniques described in U.S. Pat. No. 4,641,349, "Iris Recognition System", issued to Flom et al., both of which are incorporated herein by reference.

Figure 3A:
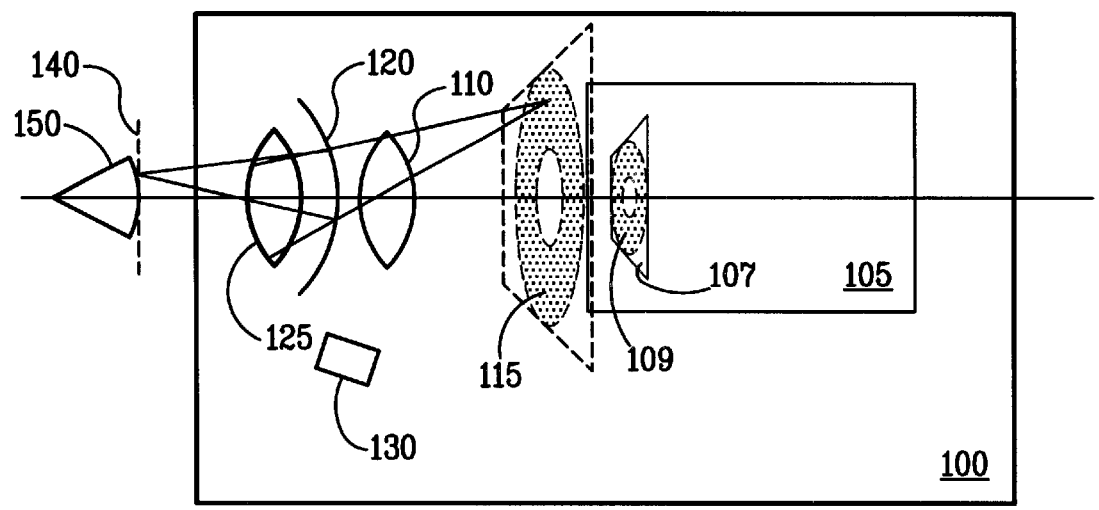
FIG. 3A is a schematic diagram of the imager of FIG. 2 shown in greater detail.

FIG. 3A shows the apparatus of FIG. 2 in greater detail. The lens 110 gives a high resolution image of the eye 150 of the user, who is positioned in front of the lens 110, so that extreme proximity between the eye 150 and the imager 100 is not required (e.g., no contact is needed between the subject and the imager 100).

The handheld iris imager comprises a solid-state image capture device and an optical system which forms an image 109 of the iris on the image capture device at the image plane of the video camera 105 and at the same time produces a virtual image 115 of the iris which the user can use to position and focus the iris image. As a result, the user can, using the same eye being imaged, see a reflected image of the iris which can be used to position the handheld imager 100 so that a good iris image (i.e., an image that can be processed and compared to those stored in a database) can be obtained.

FIG. 3A also shows an optional dioptric correction lens 125 positioned between the eye 150 and the cold mirror 120. The dioptric correction lens 125 is an adjustable optical element which corrects for the close-range focusing ability of the individual eye, which varies from subject to subject. When the lens 125 is properly adjusted, the magnified, reflected virtual image 115 of the subject's eye appears in sharp focus to the subject at the same eye-to-mirror distance at which the subject's eye is sharply focused on the front surface of the camera. This simplifies use of the imager, because the subject simply positions the image so that the virtual image 115 of the iris appears sharply focused.

A preferred embodiment of the dioptric correction mechanism has no correction lens 125 and instead has a mechanical means (not shown) for adjusting the position of the cold mirror 120 relative to the camera lens 110. This allows the user to vary the object distance of the cold mirror 120, thus changing the eye-to-lens distance at which the virtual image 115 of the iris is sharply focused. An alternative mechanical means (not shown) allows the position of the lens 110 to be adjusted so that the camera object plane coincides with the mirror object plane.

The ability to set the dioptric correction mechanism to accommodate a particular user has a great utility if the imager is used by only one person most of the time. Once the correction is set, the user can easily position the device to obtain a sharply focused reflected image. This automatically produces a sharply focused image from the camera and substantially immediate acceptance of the image by the focus assessment processor described below. Image capture time is thereby reduced and overall convenience and utility are enhanced.

An eye 150 is positioned in front of the imager 100 (e.g., about 3.5 inches in front), as shown in FIG. 3A, and the illuminator 130 is turned on. This, in turn, illuminates the eye 150 and the iris therein. Preferably, the light having wavelengths of about 400 to about 700 nanometers is reflected by the cold mirror 120, thereby forming a magnified virtual image 115 behind the mirror 120 which the user can see through the eye being imaged. The radius of curvature of the mirror is selected so that the magnified image 115 of the eye substantially fills the user's entire field of view. Hence, when the imager 100 is positioned so that the entire eye 150 is visible, it is virtually assured that the eye 150 will be substantially centered in the object plane 140 of the camera 105. Under these conditions, the light having wavelengths of about 700 to about 900 nanometers is passed by the mirror 120 and forms an approximately centered image 109 of the eye 150 at the image plane 107 of the camera 105. The image is then captured and processed, as described below.

Although a cold mirror (one which reflects shorter wavelengths and passes longer wavelengths) is described herein, it is understood that a hot mirror (one which reflects longer wavelengths and passes shorter wavelengths) could also be used in accordance with the present invention. Such a configuration is shown in an imager 101 in FIG. 3B. The eye 150 is illuminated by an illuminator 131 emitting light having wavelengths in the range of about 680 to 900 nanometers. This light is reflected by the eye 150 and the light having wavelengths in the range of about 700 to 900 nanometers is reflected by the hot mirror 121 to be focused by the lens 111 onto the front surface of the camera 106. Light reflected from the eye 150 having shorter (visible) wavelengths in the range of about 400 to 700 nanometers passes through the hot mirror 121 and strikes a concave broadband mirror 122 which reflects light having a wavelength from about 400 to 900 nanometers. This light forms a virtual image 115 of the eye 150 behind the concave mirror 122 that the user can see and use to align and focus the device, as described below.

Figure 3B:
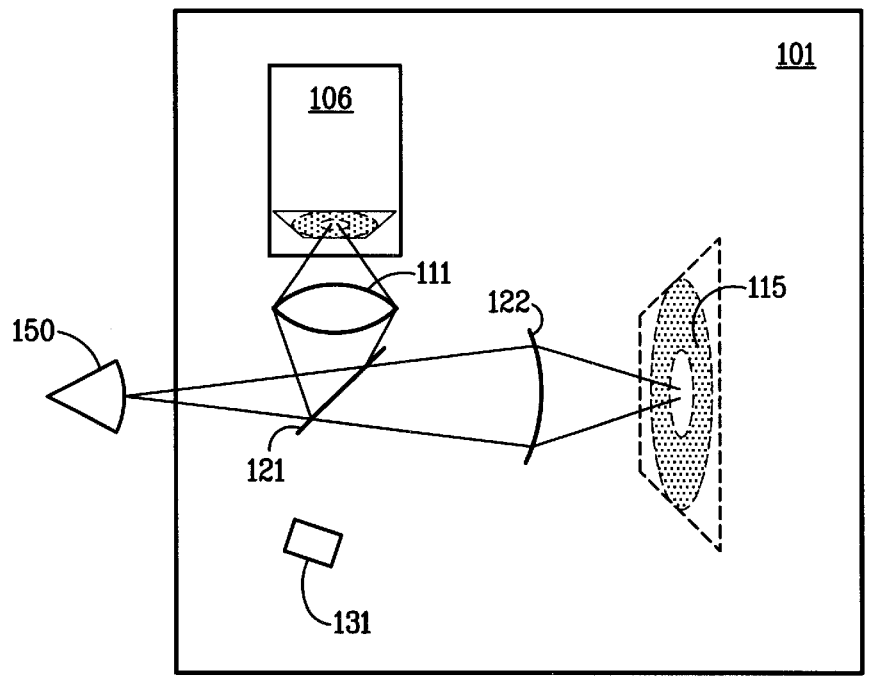
FIG. 3B is a schematic diagram of another exemplary imager in accordance with the present invention.

The imager 100 of FIGS. 2 and 3A, as well as the imager of FIG. 3B, is used in a system to identify the iris image that has been captured. The iris image can be that of a person, and animal, or any other creature that has an eye with an iris having an unique structure and characteristics.

Figure 4:
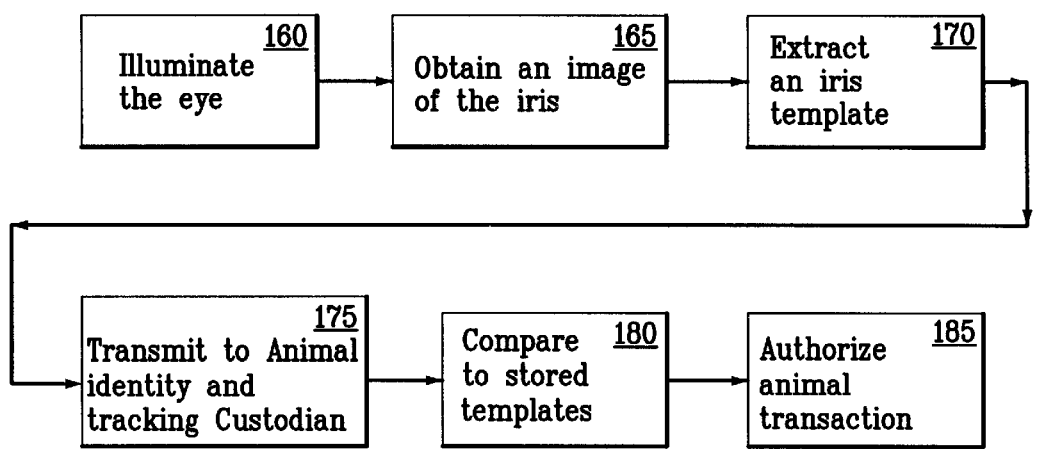
FIG. 4 is a simplified flowchart of a method of operation in accordance with the present invention.

As shown in FIG. 4, the eye is illuminated at step 160, and an acceptable or suitable image of the iris is obtained at step 165. The image is processed to extract an iris template or code at step 170, the template or code is encrypted (optional)

and transmitted to a central station, such as an animal identity and tracking chain custodian at step 175. The custodian would preferably handle the iris recognition technology and would preferably be capable of building the database, establishing local and remote access control, and applications/interface software. The central station can be regional, national, or international in scope. An example of a regional animal identity and tracking chain custodian is the Texas and South Western Cattle Raiser's Association (TSCRA). The template or code is decrypted (if necessary) and compared to pre-existing templates (or pre-existing images) and codes of authorized subscribers stored in a memory or database for identification and authentication of the animal and/or person at step 180. In accordance with one embodiment of the present invention, one or more image processing algorithms are used to extract a fixed length template (e.g., about 256 or about 512 bytes long) from each iris image. Iris images are compared at step 180 by determining the percentage of bits in each template that match. If the percentage of bits that match exceeds a predetermined threshold (e.g., 75%), then it is determined that the iris images being compared belong to the same iris, thereby identifying the subject being tested. If the animal and person are properly identified and authenticated, the animal transaction is authorized, the animal identity and tracking chain custodian authorizes (e.g., enables) the animal transaction at step 185. The animal identity and tracking chain custodian can either authorize the animal transaction at the central station or send a signal to a remote local processor directing it to authorize the animal transaction.

Figure 5:
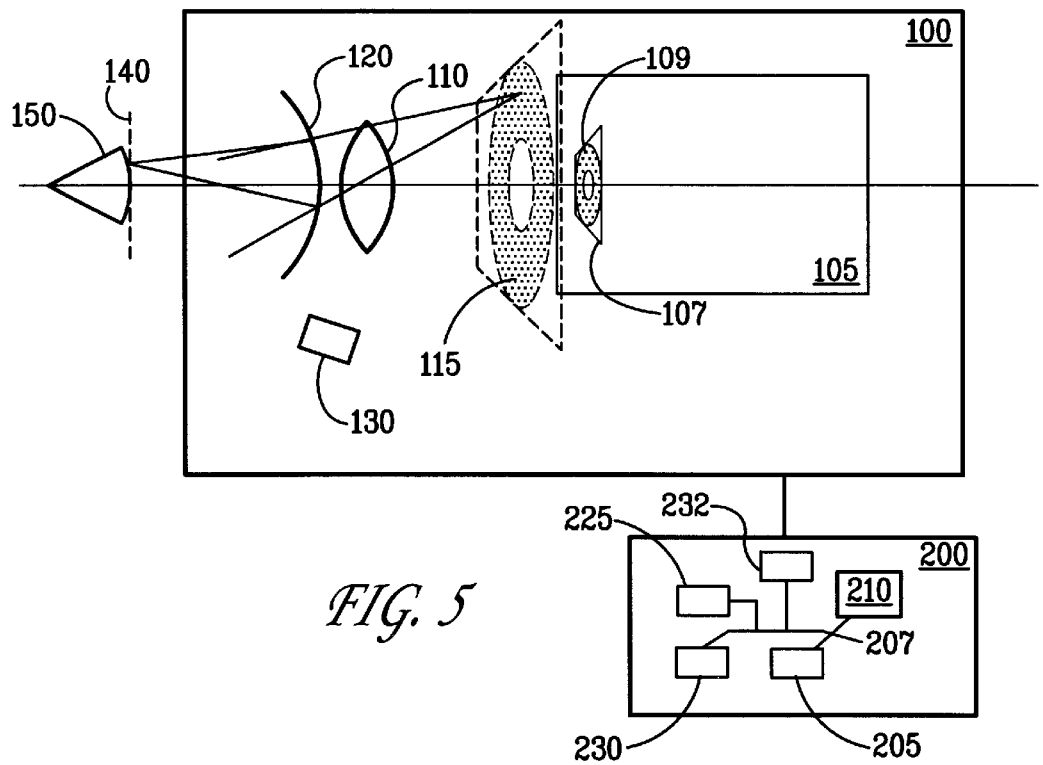
FIG. 5 is a schematic diagram of an exemplary iris image recognition system in accordance with the present invention.

FIG. 5 is a schematic diagram of an exemplary iris image recognition system in accordance with the present invention. The imager 100 can be coupled to a microprocessor 210 that performs the processing, encryption, and comparison. The microprocessor 210 can reside in a conventional computer system 200, such as a standard personal computer, or within a separate computing device, such as an IrisEngine manufactured by IriScan Inc., of Marlton, N.J.

The microprocessor 210 is coupled to the imager 100 via conventional cables and/or printed circuit boards (PCBs) that are connected into slots on the computer such as an ISA slot or a PCI slot. Other conventional means for coupling the imager 100 and the microprocessor 210 can be employed. The microprocessor 210 controls the imager 100 and runs software held in read only memory (ROM) 205. The processor 210 is connected via a bus 207 to the ROM 205, a random access memory (RAM) 232, another memory such as an erasable programmable ROM (EPROM) 230, and an input/output (I/O) controller 225. The RAM 232 is large enough to hold at least one captured image of an iris. The I/O controller 225 is connected to the appropriate circuitry and drivers (not shown) for issuing commands to control the imager 100.

The imager 100 preferably uses a digital camera and transmits digital images directly to the processing unit 210. "On/off" data is transmitted from the imager 100 to the processor 210 to initiate the image acquisition function. A digital image could be provided if a digital camera is used.

The image processing consists of a number of image processing steps (such as those described in U.S. Pat. No. 5,291,560 and U.S. Pat. No. 5,572,596, which are herein incorporated by reference) which lead to extraction of a unique and highly specific digital biometric template that can be used to identify the individual based on intensity patterns within the iris. The biometric template is then compared against other templates or images stored in memory (such as RAM or EPROM) 230 within the computer 200, or it can be transmitted to the central station (not shown) where it is compared against other templates stored in a memory or central database. The database stores selected data representing images of the iris of a plurality of subjects. A match of the biometric template with a template stored in the database identifies the subject (e.g., the animal or the person) whose iris is being imaged.

Figure 6:
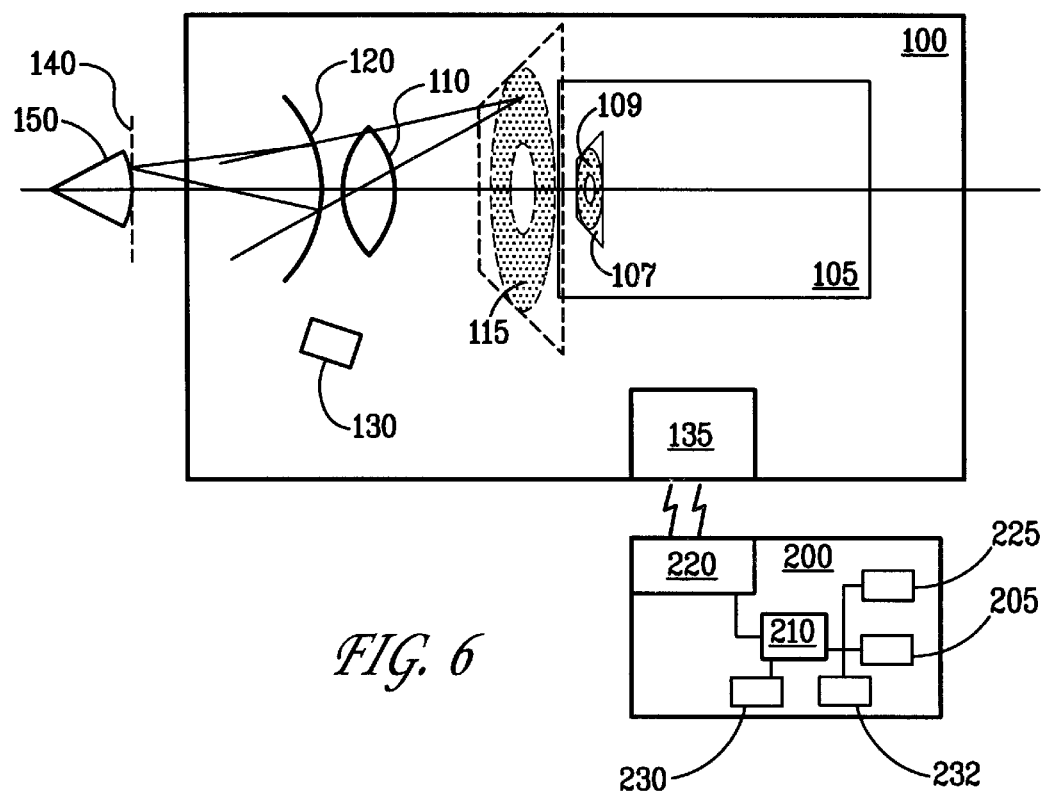
FIG. 6 is a schematic diagram of another exemplary iris image recognition system in accordance with the present invention.

As shown in FIG. 6, the imager 100 can be linked to the microprocessor 210 via wireless means, such as a RF modem 135 residing within the imager 100 communicating with a companion modem 220 on the microprocessor 210 or elsewhere within in the computer 200. This increases the flexibility of the imager 100 for certain applications where the limited range of motion imposed by a wired connection would limit its usefulness. These might include, for example, certain applications such as animal identification, or medical and corrections facilities where it is not desirable or convenient to bring the subject whose eye is 30 being imaged close to the external computer 200. The modem 135 also can receive instructions from the computer 200, such as to illuminate the lamp 130, or activate visible and/or audible indicators (described below with respect to FIG. 7).

Although an image of the animal's eye is reflected back to the subject in mirror 120, this may not provide the desired feedback to the user to enable the user to properly position the imager so that a suitable iris image is obtained. For example, a user may be a novice in using and positioning the imager 100 with respect to the eye 150, or the user may be attempting to image the eye of another subject with the imager. Thus, preferably, the imager 100 comprises a passive feedback mechanism to guide the user in positioning the eye 150 to an optimum location to allow acquisition of a suitable image.

Figure 7:
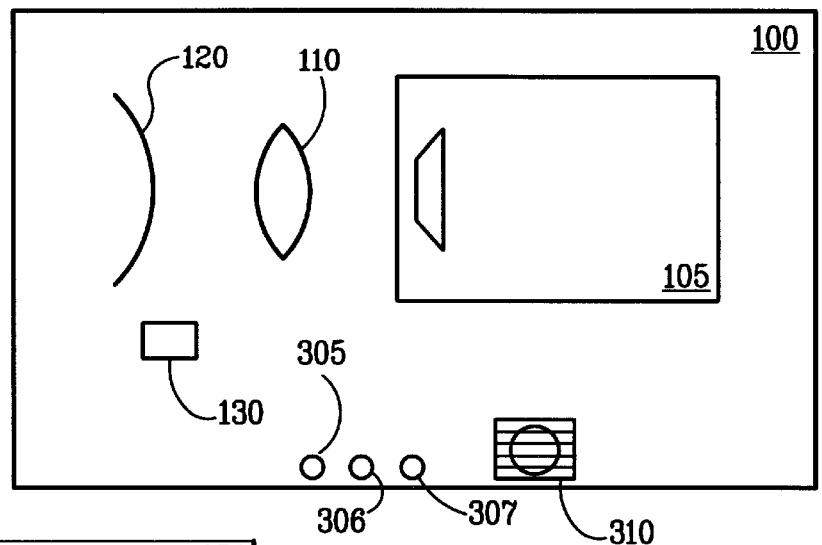
FIG. 7 is a schematic diagram of an exemplary iris imager having visual and aural indicators in accordance with the present invention.

The passive feedback mechanism is an indicator or combination of indicators that provides, on a near real-time basis, an indication to the user that an adequate iris image has or has not been obtained. FIG. 7 is a schematic diagram of an exemplary iris image recognition system that includes position indicators in accordance with the present invention. Preferably, the indicator is visible and/or audible, such as, for example, an indicator lamp 305 (e.g., a light emitting diode (LED)) that lights when an acceptable image has been captured (i. e., "image acquired"), and an aural indicator via a speaker 310, such as a beep or other tone, that sounds periodically until an acceptable image has been captured (i.e., "imaging in progress").

Additional indicators 306, 307 can be also be used, either alone or in combination, for such indications as "subject identified—accept" and "subject not identified—reject." These indications would be activated pursuant to the results of the processing and comparison performed at the microprocessor 210, as described above with respect to FIG. 4. Alternatively, other display devices (not shown), such as liquid crystal displays could be used as indicators.

The imager 100 also preferably has an on/off switch (not shown), such as a pushbutton, for powering up the imager and initiating the image acquisition process. Power for the imager 100 is preferably supplied by a battery. The imager 100 receives and acts on instructions from the processor 210 to perform functions such as lighting or turning off the indicator lamp(s) 305, providing the audible signals via the speaker 310, and lighting the 'accept' and 'reject' indicators.

Figure 8:
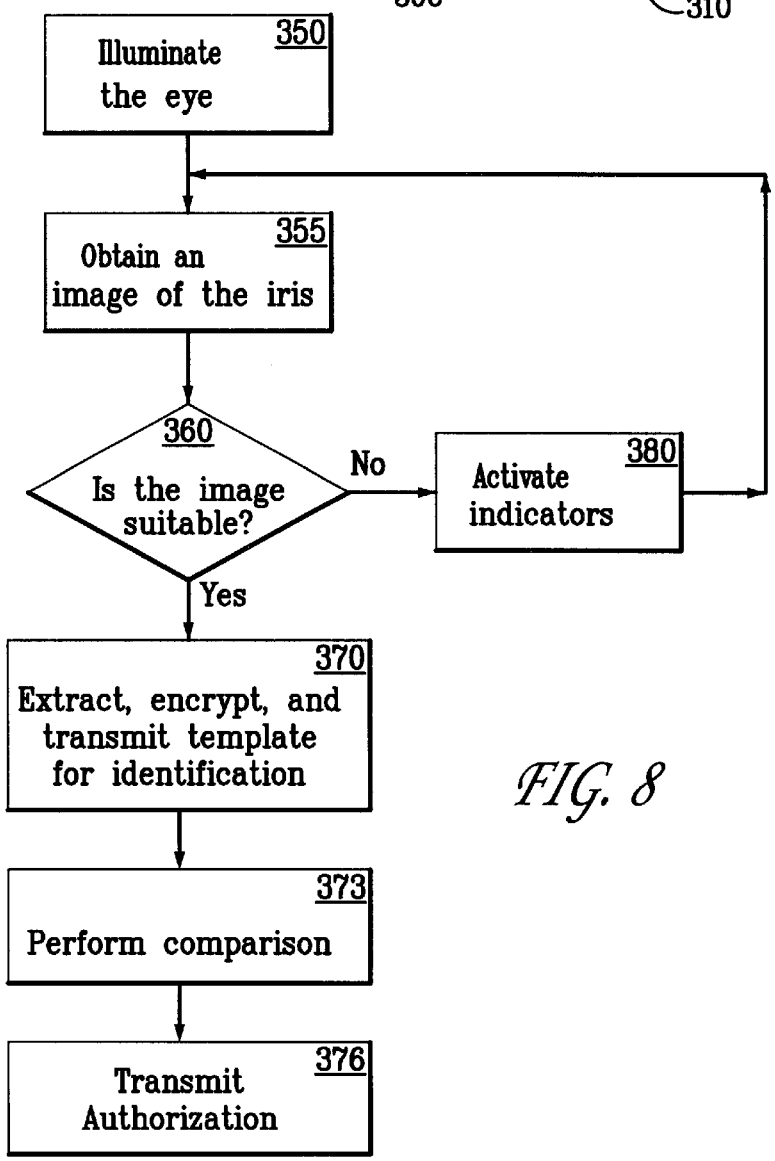
FIG. 8 is a more detailed flow chart of a method of operation in accordance with the present invention.

FIG. 8 is a more detailed flow chart of a method of operation in accordance with the present invention. The eye is illuminated at step 350 and an image of the iris is obtained at step 355. At step 360, it is determined if the image is suitable for use with the image processing and comparison routines. If the image is suitable, the image is passed to the processor for further processing, at step 370, and transmission to the animal identity and tracking custodian. A comparison of the template to the templates stored in a database at the animal identity and tracking custodian is performed at step 373. If the comparison provides a positive match, then authorization is granted at step 376 for the animal transaction to be consummated. If the comparison does not provide a positive match, then authorization is not granted for the person or persons to complete the animal transaction.

If the image is not suitable at step 360, then at step 380, the indicator(s) is activated (e.g., a beep sound is issued), and processing continues at step 355 (i.e., another image is obtained).

Figure 9:
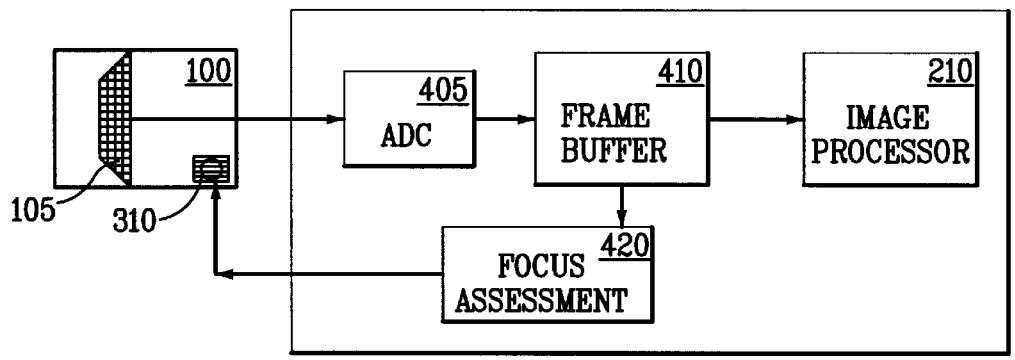
FIG. 9 is a schematic diagram of an exemplary iris image recognition system having a focus assessment processor in accordance with the present invention.

Because the eye's own focusing system automatically adjusts to bring the virtual image 115 into sharp focus to the user, it cannot be relied upon to always accurately focus the eye image on the camera 105. For this purpose, a focus assessment system is used in one embodiment, as shown in FIG. 9. Video image information from the imaging device 100 is received as either an analog or a digital video signal that conforms to standard formats. Preferably, digital video image information from the imaging device 100 is stored in a frame buffer memory 410, such as a RAM similar to RAM 232 described above with respect to FIG. 5, and capable of storing one complete frame of digitized video information. A focus assessment processor 420 accesses the digitized image information and applies certain measurement algorithms which are disclosed in a co-pending application entitled "Video-Rate Focus Assessment", Ser. No. 60/109,960, and incorporated herein by reference. The output of the focus assessment is used to control an indicator, such as the audible indicator 310. As long as the focus assessment processor 420 determines that the captured image is not acceptable for further processing and comparison, the audible indicator 310 is directed to emit periodic sounds to alert the user. Images are repeatedly acquired and assessed until an acceptable one is received. After an acceptable iris image has been received, the audible indicator 310 is turned off and the final image is retained for further processing and comparison, for example, by the microprocessor 210, as described above.

Any known technique for image focusing can be used with the imager of the present invention, such as those described in U.S. Pat. No. 4,876,608, entitled "Focus and Signal to Noise Measurement Routines in Input Scanners", issued to Eaton, U.S. Pat. No. 5,151,583, entitled "Focus Adjustment Device Having Restricting Means for Restricting a Selecting Action According to the Degree of Nearness of a Distance Measurement", issued to Tokunaga et al., and U.S. Pat. No. 5,404,163, entitled "In-Focus Detection Method and Method and Apparatus Using the Same for Non Contact Displacement Measurement", issued to Kubo. The preferred system and method for focus assessment is described below.

A focus score is computed for each video frame (i.e., each captured image). If the focus score exceeds a predetermined value, then it is determined that the image is focused enough for further processing and comparison. If the focus score does not exceed the predetermined value, then it is determined that the image is not focused enough for further processing, and an indicator (such as indicator 310, described with respect to FIG. 7) is activated and a further image is captured. Alternatively, a sequence of image frames can be obtained that cycle through a range of focus distances strobed at the video frame-rate, and the focus score computed for each frame can enable the selection of the best focused frame within the sequence of frames. For example, by obtaining image frames at each of several different lens settings and then fitting a spline curve to their respective focus scores one can predict the lens position that would deliver substantially the sharpest focus, by setting the derivative of the parameterized spline curve to zero and then solving the equation for position.

Specific implementation features of the preferred focus assessment system and method which enable its real-time operation, include (1) the computation of quantities in the 2D Fourier domain, without needing to compute an actual 2D Fourier Transform of an image (this avoids the need for approximately 2.25 million floating-point operations required for an FFT (Fast Fourier Transform) on a 500×500 pixel image, as the computational complexity of an FFT on n×n data is $O(n^2 \log_2 n)$); (2) only 6,400 integer multiplications (squarings) are performed, which in turn can be eliminated altogether by using small look-up tables; (3) no floating-point operations are required; (4) computation of focus scores is based upon simple algebraic combinations of pixel values within local closed neighborhoods, repeated across regions of the image; and (5) these operations not only allow the algorithm to execute in real-time, but it also enables a straightforward implementation in simple, low-cost, hardware devices that could be embedded within a digital camera or frame grabber.

Preferably, the focus assessment processor 420 is fast enough to determine a focus score for each frame in a video image stream in less than the time it takes to acquire a new frame (e.g., approximately 25 ms). The frame-by-frame focus scores can be used to control a moving lens element for rapid and accurate focus control, or alternatively, to select which of several frames in a video stream is the one in best focus. The rapid selection of well-focused video frames for further processing, such as image analysis and pattern recognition, is important in real-time computer vision because it prevents wasting processing time on poorly-focused images.

The preferred focus assessment processor measures the focus quality of video images at standard rates of 25 (PAL) or 30 (NTSC) frames per second.

It is contemplated that the focus assessment processor 420 can be implemented in a general purpose personal computer (PC) or by a dedicated, low cost processor which is small enough to be incorporated into the camera electronics.

The processing of a video frame results in the return of an integer value (on a scale between 0 and 100) reflecting the quality of focus; the larger the value of the integer, the better the focus. A value of 0 indicates a completely defocused image whereas the value of 100 indicates maximum focus quality. A predetermined threshold is used to determine whether an image is sufficiently focused or whether another image needs to be retrieved. For example, values greater than about 40 can indicate sufficient quality of focus to warrant further image processing, while values less than about 40 cause a new image frame to be grabbed, and optional feedback provided to the focusing mechanism, if one exists, or to the subject controlling the camera position (via the indicator 310, for example).

Optical defocus is a phenomenon of the 2D Fourier domain. An image represented as a 2D function of the real plane, $I(x,y)$, has a 2D Fourier Transform $F(\mu,v)$ defined as shown in equation 1.

$$F(\mu, v) = \frac{1}{(2\pi)^2} \int_x \int_y I(x, y) e^{i(\mu x + v y)} dx dy \quad (1)$$

In the image domain, defocus is preferably represented as convolution by the 2D point-spread function of the defocused optics. This in turn may be modeled as a Gaussian whose space constant is proportional to the degree of defocus. Thus, for perfectly focused optics, the optical point-spread function shrinks almost to a delta function, and convolution with a delta function causes no change to the image. Progressively defocused optics equates to convolving with a wider and wider point-spread function, which averages together whole neighborhoods of pixels by such a weighting function, thereby producing an increasingly blurred image.

If the convolving optical point-spread function causing defocus is modeled as a Gaussian whose width represents the degree of defocus, then defocus is equivalent to multiplying the 2D Fourier Transform of a perfectly focused image with the 2D Fourier Transform of the "defocusing" (convolving) Gaussian. This latter quantity is itself just another 2D Gaussian but in the Fourier domain, and its space constant ($\sigma$) there is the reciprocal of that of the image-domain convolving Gaussian that represented the optical point-spread function. The preferred focus assessment processor uses (1) the duality of convolution and multiplication in the two domains; (2) the fact that a Gaussian has a Fourier Transform which is itself a Gaussian, but with the reciprocal width because of (3) the Similarity Theorem. Thus, the 2D Fourier Transform $D_\sigma(\mu,v)$ of an image defocused to degree $\sigma$ is related to $F(\mu,v)$, the 2D Fourier Transform of the corresponding in-focus image, as given by equation 2.

$$D_\sigma(\mu, v) = e^{-\left(\frac{\mu^2 + v^2}{\sigma^2}\right)} F(\mu, v) \quad (2)$$

From the above equation, the effect of defocus is to attenuate primarily the highest frequencies in the image, and that lower frequency components are virtually unaffected by defocus since the exponential term approaches unity as the frequencies ($\mu,v$) become small. For simplicity, the present description has assumed isotropic optics and isotropic blur, and the optical point-spread function has been described as a Gaussian. However, the analysis can readily be generalized to non-Gaussian and to anisotropic optical point-spread functions.

Thus, an effective way to estimate the quality of focus of an image is to measure its total amount of energy in the 2D Fourier domain at high spatial frequencies, since these are the most attenuated by defocus. One may also perform a kind of "contrast normalization" to make such a spectrally-based focus measure independent of image content, by comparing the ratio of energy in the highest frequency bands to that in slightly lower frequency bands. Such spectrally-based energy measurements are facilitated by exploiting Lord Rayleigh's theorem for conserved total power in the two domains, shown in equation $$\int_{-\infty}^{+\infty} \int_{-\infty}^{+\infty} |I(x, y)|^2 dx dy = \int_{-\infty}^{+\infty} \int_{-\infty}^{+\infty} |F(\mu, v)|^2 d\mu dv \quad (3)$$

Thus, high-pass filtering or band-pass filtering an image at a ring of high spatial frequency (using only convolution in the 2D image domain) and measuring the residual energy, is equivalent to making the corresponding energy measurement in the high frequency bands of the 2D Fourier domain. The appropriate measurements in the 2D Fourier domain to assess focus can be performed without computing a time-consuming 2D Fourier Transform. Indeed, the measurements can be performed without even a single floating-point operation, and even without any multiplications if appropriate convolution kernels and look-up tables are used.

A real-time procedure for focus assessment based on these theoretical principles is used in the focus assessment processor 420. It executes much faster than the video frame-rate, and so real-time focus assessments can be made on a frame-by-frame basis. These can be used either to control the position of a focusing lens element, or alternatively as a type of autofocus system in which frames are grabbed at a variety of focal depths in order to select only the best one for processing, or to prevent time being wasted on processing image frames which are assessed to be in poor focus.

The 2D spectral measurements described above can be implemented by convolving an image with the following convolution kernel, in which pixel values within a predetermined region, such as, for example, an (8×8) neighborhood, are added together with the weights indicated in each of the cells:

| −1 | −1 | −1 | −1 | −1 | −1 | −1 | −1 |
|---|---|---|---|---|---|---|---|
| −1 | −1 | −1 | −1 | −1 | −1 | −1 | −1 |
| −1 | −1 | +3 | +3 | +3 | +3 | −1 | −1 |
| −1 | −1 | +3 | +3 | +3 | +3 | −1 | −1 |
| −1 | −1 | +3 | +3 | +3 | +3 | −1 | −1 |
| −1 | −1 | +3 | +3 | +3 | +3 | −1 | −1 |
| −1 | −1 | −1 | −1 | −1 | −1 | −1 | −1 |
| −1 | −1 | −1 | −1 | −1 | −1 | −1 | −1 |

It should be noted that no pixel-by-pixel multiplications are needed in order to impose these weights. Rather, the pixels in the central region are added together, such as the (4×4) square, that sum is tripled, and then all pixel values in the outer two pairs of rows and columns are subtracted from the tripled sum. The result is squared and added to an accumulator, thus implementing the left-hand side of equation (3) above for this local region of the image. The complete (8×8) convolution kernel is then moved to a new position in the image, along a sampling grid that selects every 4th row and every 4th column, and the operation is repeated. Thus, to assess the quality of focus within the central (320×320) region of an image, this set of 64 pixel summations followed by a squaring operation is repeated a total of $(320/4)^2 = 6,400$ times.

In the 2D Fourier domain, the spectral consequences of this operation can be appreciated by examining the 2D Fourier Transform of the convolution kernel above. The kernel is equivalent to the superposition of two centered square box functions, one of size (8×8) and amplitude −1, and the other of size (4×4) and amplitude +4 (for the central region in which they overlap, the two therefore sum to +3). The 2D Fourier Transform of each of these square functions is a 2D "sinc" function, whose size parameters differ by a factor of two in each of the dimensions and whose amplitudes are equal but opposite, because the two component boxes have equal but opposite volumes. Thus, the overall kernel has a 2D Fourier Transform $K(\mu,v)$ which is the difference of two differently-sized 2D sinc functions, as given by equation 4.

$$K(\mu, v) = \frac{\sin(\mu)\sin(v)}{\pi^2 \mu v} - \frac{\sin(2\mu)\sin(2v)}{4\pi^2 \mu v} \qquad (4)$$

This is a high-pass (or ultimately a band-pass) filter, selecting only a high range of spatial frequencies in all orientations. Toward its center, corresponding to very low spatial frequencies, its value approaches zero (as can also be inferred from the fact that the sum of all pixel weights in the convolution kernel shown above is zero). Thus, low frequencies play little or no role in computing a focus score, and only relatively high frequencies contribute significantly to the computation of a focus score. Equation (3) shows that summing the squares of all the local convolution sums across the image is equivalent to summing the total amount of high frequency energy in the 2D Fourier Transform of the image. The action of the convolution kernel is to impose the above power spectral weighting function so that primarily high frequency energy is measured.

Finally, the summated 2D spectral energy is passed through a compressive nonlinearity of the form $f(x)=100x^2/(x^2+c^2)$ in order to generate a normalized focus score in the range of 0 to 100 for any image.

The focus assessment technique is applied immediately after each image frame is digitized and stored in the frame buffer memory 410 in order to assess whether the focus quality is sufficient to warrant any further processing. If the calculated focus quality value of the captured image is greater than or equal to a predetermined value, the image is passed to applicable programs for further processing, for example for extraction of a biometric template. The focus assessment technique can be used to compare the relative focus of an entire series of images in order to select the one most in-focus (e.g., having the highest focus assessment score), as well as to measure a single image.

The focus assessment technique can be used to provide a feedback indication to a system user who controls the position of the imager relative to the object being imaged. This can be accomplished by activating an indicator which would continue, while successive images are captured and their focus assessed, until the focus assessment score exceeds a predetermined value. At this point, the indicator is deactivated and the last image captured is transferred to the image processor 210 where it is processed to extract the biometric template.

The application of the focus assessment technique in combination with the feedback indicator helps resolve the man-machine interface problems associated with the use of digital imaging devices on the eye. Individuals using the system are provided positive, objective indicators and feedback as to the quality of image focus. The focus assessment processor can also be used in any situation where it is required to determine the quality of focus of video images at industry standard frame rates (NTSC and PAL).

Thus, the image is obtained at the imager and transmitted to an analog to digital converter 405. The digitized video information is then stored in a frame buffer memory 410. The focus assessment processor 420 isolates the central 320×320 region of the image. 8×8 pixel blocks (each pixel is in only one block) are then processed by first summing pixels in the central 4×4 region, tripling that sum, and then subtracting from this value all the pixel values in the outer two pairs of rows and columns. This result is then squared. This process is performed on each 8×8 block, and the results are summed. After the entire image has been processed, the summed result is compressed nonlinearly to generate a focus score between 0 and 100. This score is then compared to a predetermined number for determining if the indicator 310 should be activated.

Figure 10:
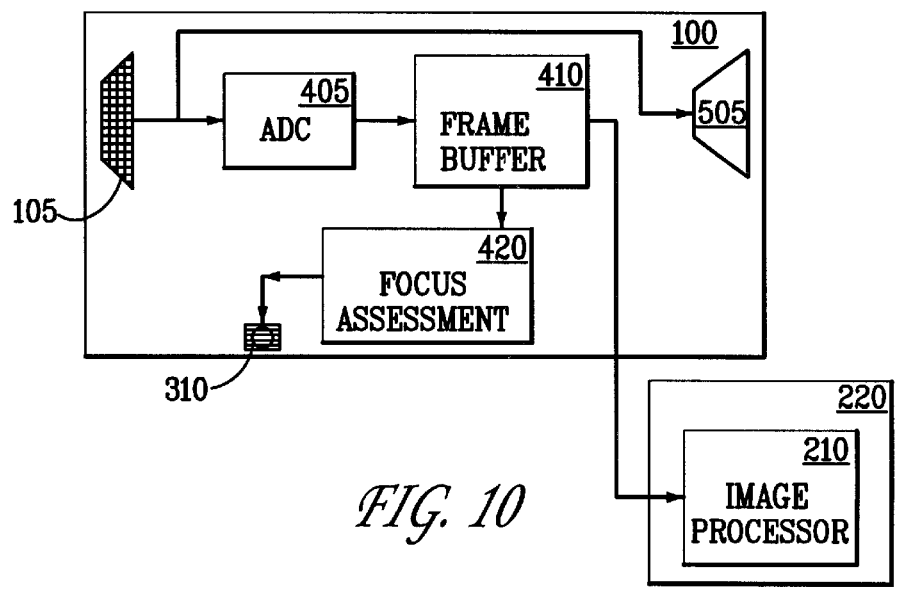
FIG. 10 is a schematic diagram of an exemplary iris imager comprising a focus assessment processor in accordance with the present invention.

The focus assessment can be performed by the microprocessor 210 in the computer 200, or it can be a separate processor element. For example, the focus assessment processor 420 can be disposed within the handheld imager 100, as shown in FIG. 10, and not be external to the imager 100, as shown in FIG. 9. A benefit of this embodiment is that the selection of a properly focused image can occur within the hand-held device, so that only a single, acceptable image is transmitted to the external processor 210. In the embodiment shown in FIG. 9, the focus assessment algorithm is typically performed within a personal computer, so digitized image data is transmitted to the personal computer at video rates. However, the high data rates associated with transmission of digitized video cannot be supported by some types of computers, particularly notebook-style personal computers. If the focus assessment is performed in the handheld device 100, the single selected video frame can then be transmitted at a lower data rate which is compatible with notebook-style personal computers. This greatly enhances the flexibility and versatility of the handheld imaging device of the present invention.

As shown in FIG. 10, the video signal (analog) from the camera 105 is converted to digital format by an analog-to-digital converter 405 and each frame of video is stored in a frame buffer memory 410. The converter 405 and memory 410 are similar to those described above with respect to FIG. 9, but are disposed within the handheld imager 100. Data in the frame buffer 410 is processed by a focus assessment processor 420 which is also contained within the handheld imager 100. The results of the focus assessment control an audible indicator 310 which emits a sound that is discontinued when an acceptable video frame is acquired. The single video frame that has been determined to be acceptable is transmitted to another processor 210 (typically within a personal computer 200) for further processing and comparison.

It is contemplated that in addition to the focus assessment processor, an auto-focus lens system could be used in the present invention. The results of the focus assessment control the lens system, thereby automatically adjusting focus to produce an optimal image. This would place less of a premium on the accuracy with which the user positions the eye, and would be helpful if the user could not see or hear the indicators described above.

Preferably, the imager of the present invention is equipped with a display, such as a miniaturized back-illuminated liquid crystal display (LCD) 505. The LCD display 505 can be disposed on the side of the imaging system opposite the subject whose eye is being imaged. The video signal generated by the camera 105 is continuously displayed on the LCD display 505 to permit an operator (other than the subject whose eye is being imaged) to control the position of the hand-held imaging device 100 and thereby center the eye's image in the field of view to more easily achieve proper focus, as indicated by the sound emitted by the audible indicator 310. This allows the device to be used on subjects who are unable or unwilling to cooperate in the image acquisition process. Thus, in accordance with the present invention, either a user can scan his own iris (e.g., for entry to a building) or a user can scan another subject's iris (e.g., for identification).

Figure 11:
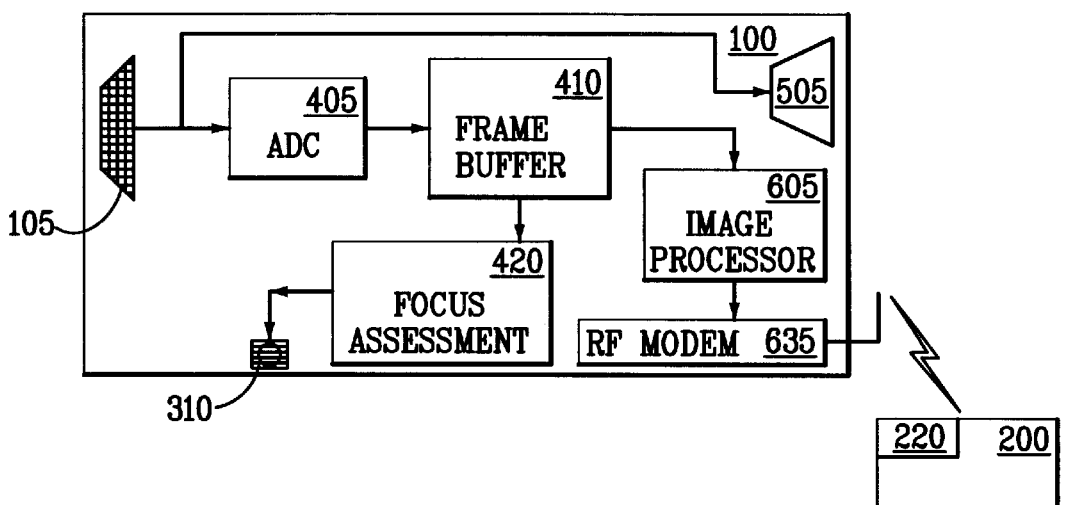
FIG. 11 is a schematic diagram of another exemplary iris imager comprising a focus assessment processor in accordance with the present invention.

An additional embodiment of the present invention is shown in FIG. 11. In FIG. 11, an additional processor 605 has been added to the device of FIG. 10. The additional processor 605 extracts the iris image data, processes it to produce a biometric template, and encrypts it so that the output of the handheld imager 100 is an encrypted biometric template that can be used by the processor 210 in the computer 200 for comparison. Encryption can be with any of the known encryption techniques using public and private keys to encipher and decipher the data, respectively. One advantage offered by this embodiment of the invention is that the added functionality required to add the biometric identification technology to a computer system is contained within the handheld imager 100, thereby simplifying installation, support, and service. Secondly, the security of transactions which utilize the biometric template is enhanced because the data is generated and encrypted totally external to the computer 200 and thus is less susceptible to theft, alteration, or interception.

In the embodiment of FIG. 11, a wireless modem 635, similar to the modem 135 described above with respect to FIG. 6, is shown. The encrypted biometric template from the processor 605 is transmitted via the modem 635 to the computer 200 for further processing and comparison. The modem 635 also receives instructions from the computer 200, such as to activate visible and/or audible indicators.

Figure 12:
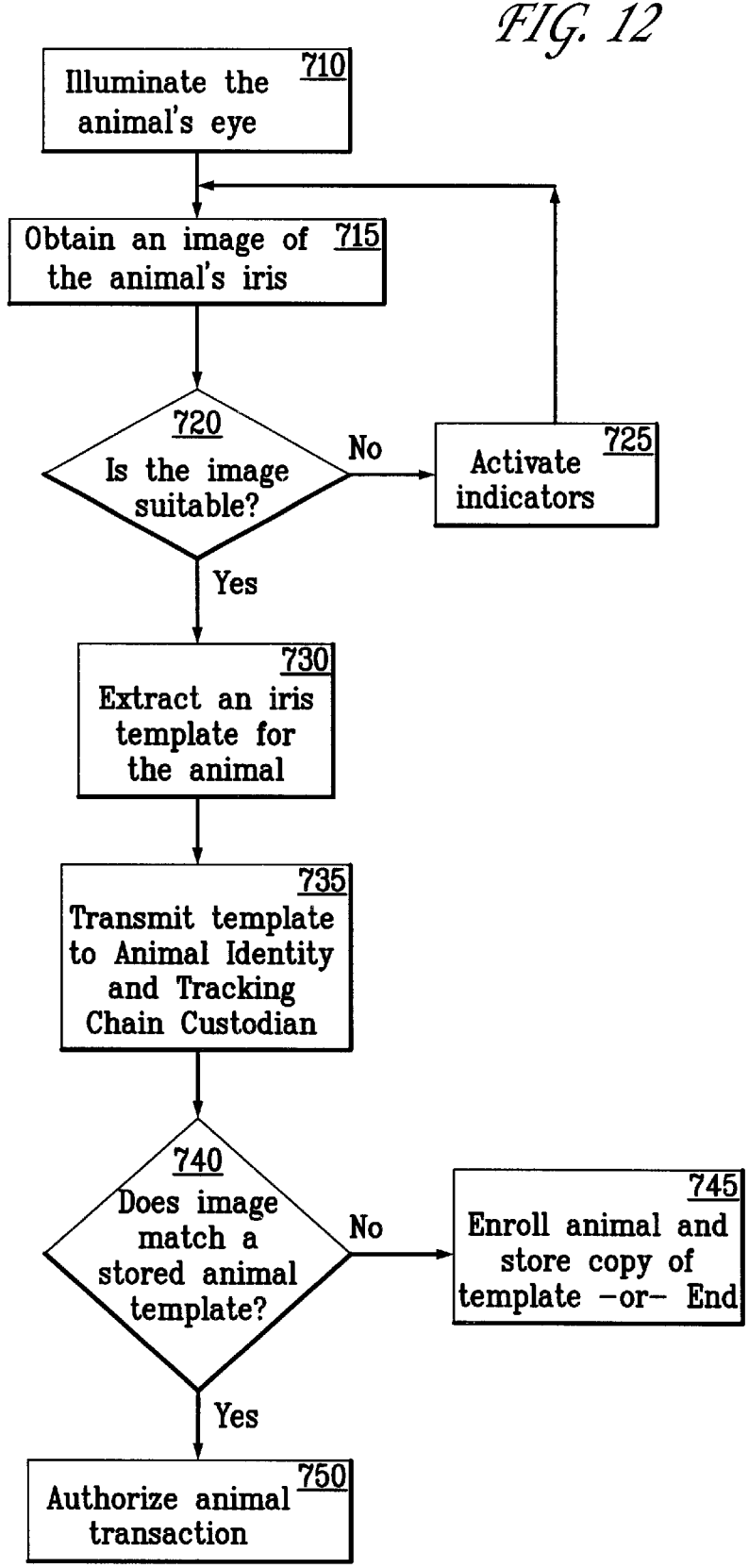
FIG. 12 is a flow diagram of an exemplary method of identifying an animal in accordance with the present invention.
Figure 13:
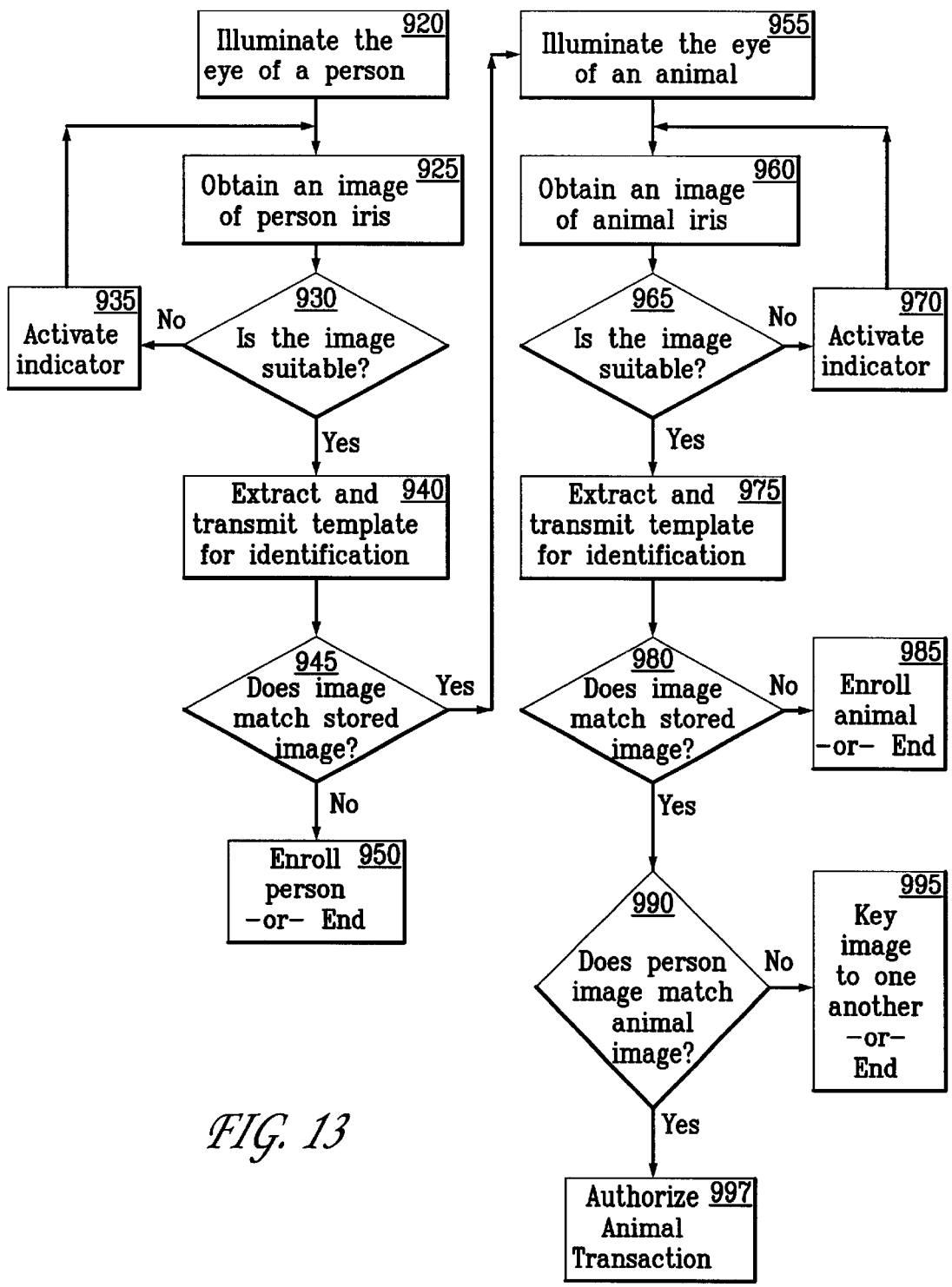
FIG. 13 is a flow diagram of an exemplary method of identifying an animal and a person and also matching the person with the animal in accordance with the present invention.

The iris imager of the present invention can be used in an animal identification and transaction authorization system that identifies an animal based on the iris recognition techniques described above. The present invention provides various animal industries with a non-invasive, accurate, and reliable method of identifying animals, and also of identifying and matching owners and animals. FIG. 12 shows a flow diagram of an exemplary method of the present invention that can be used for identification of one or more animals in order to authorize a transaction involving the animal or animals. FIG. 13 shows a flow diagram of another exemplary method in accordance with the present invention that can be used for identification of one or more animals and for the identification of one or more persons, and for authentication of a match between the animal and the person in order to authorized a transaction involving the animal and the person.

According to one exemplary embodiment of the present invention described below with respect to FIG. 12, the animal identification and authorization system and method can be used to track and/or identify an animal in situations where the identity of the animal is important, but the identity of the person is not necessarily important. Examples of animal transactions where it would be desired to authenticate the identity of the animal, but not necessarily the person, prior to completing the animal transaction include animal breeding or genetic performance monitoring, theft prevention of animals, food safety, the health care of animals, commercial transactions involving animals, competitive events involving animals, the registration or licensing of animals, the marking or branding of animals, etc.

For example, when a person is interested in breeding an animal with another animal, the identity of the animal is an important consideration in this process. During the breeding of animals, such as, for example, thoroughbred horses or cattle, the pedigree and family history of the animal can be important in determining the traits and characteristics of the offspring. With horses, it is desirable to breed with a horse having a history of performing well in races and producing offspring that are of a high racing caliber. Likewise with cattle, certain bulls produce superior offspring that may be better acclimated to certain climates, may be better at withstanding extreme temperatures, may require less or cheaper food and water, may grow to be bigger than other cattle, may produce more or superior cuts of meat, etc.

Regarding the health and care of an animal, it is desirable to be able to accurately keep track of the health, shots, and immunization records of a particular animal. This allows owners and food safety personnel to be able to track individual animals and better control diseases among animals and the safety of animal food products.

It may be important to identify an animal that is involved in commercial activities or a competitive event where the animal is a participant and the outcome of the event may depend on the animal. For example, in situations where an animal is involved in a commercial activity may include where an animal is rented or leased based on the physical attributes or some other talent of the animal. The commercial entity that is paying for the animal would want to ensure that the animal that they contracted for is in fact the animal that is delivered to perform the work or show. Racing is a competitive event where the outcome may depend on the identity of the animal that is participating in the event. For example, in both horse racing and dog racing, large sums of money are waged based on the name, racing history, and physical traits of a particular animal. It is desirable to confirm the identity of each animal prior to the event, to ensure a fair and equitable result.

Also, the accurate identification of an animal is important during the registration or licensing of the animal, such as household pets, with the proper authorities. Registration and licensing are generally implemented by governing bodies for identification of ownership, public welfare and health reasons, and to prevent the theft of animals. It is desirable that an accurate, nonintrusive, and tamper-proof identification system be used to register, mark, and license animals.

The present invention is directed to a system and method for identification of animals based on a feature of the iris of the eye of the animal. An image of the animal's eye is captured using an iris acquisition device, as discussed herein above. Slight modifications in size and layout of the system components described above are contemplated as being within the scope of the invention. These modifications can be based on variations between animals, such as the type of animal, whether the animal is domesticated or wild, the threat or danger posed by the animal, the size of the animal, the eye and the iris, the unique characteristics and structure of the iris for each animal, etc. The technique used to extract the structure of the iris template (e.g., the IRISCODE™) can also be modified, as necessary based on the particular animal, and the characteristics and structure of the iris. The iris imaging processing technique permits reliable limbus and pupil demarcation, eyelid and eyelash detection, removal of other artifacts, and wavelet decomposition of animal iris images in order to produce acceptable iris images.

FIG. 12 is a more detailed flow diagram of the exemplary animal identification process of FIG. 4 in accordance with the present invention. An operator desiring to verify the identity of an animal, or to enroll the animal in an identification database, obtains an image of the iris of the animal as follows. An imager, similar to imager 100 described above with reference to FIGS. 2 through 11, is used at step 710 to illuminate at least one eye, and thus the iris, of an animal. An image of the iris is obtained at step 715. At step 720, it is determined whether the image is suitable for further processing and comparison, as described above. If the image is not suitable, the appropriate indicators are activated at step 725, and processing returns to step 715 with the capture of another iris image.

If the captured image is suitable for further processing, the image is processed at step 730 to extract an iris template (e.g., the IRISCODE™). Preferably, the template comprises about a 256 or about a 512-byte code, for example. Optionally, an indicator can be activated to alert the operator that a suitable image has been captured. The extracted image is transmitted to a database at step 735, where the obtained image template is compared to stored templates residing in a database. The database can include one of a plurality of remote local servers, or preferably, the database is a central database. If the iris template is invalid, meaning that no match was found during the comparison at step 740, then two options are available to the operator. At step 745, the animal identification process may be terminated, or alternatively the operator may enroll the animal at this time.

If the iris template is valid, meaning that a match was found between the captured image and the stored images during the comparison at step 740, then the identity of the animal has been authenticated (e.g., confirmed) and the animal transaction involving the animal is authorized at step 750. Authorization can be indicated by an audible or visual indication, or can include an electronic or paper document memorializing the animal transaction and authorization. A unique authorization code can be sent from the processor at the central database to the processor at the remote server or handheld imager.

In addition to identifying animals, it is desirable in certain animal transactions to identify one or more persons in the animal identity and tracking chain who are involved in the animal transaction. Examples of animal transaction where both an animal's identification and a person's identification in the identity and tracking chain may be important include: sales of animals between a buyer and seller; trading or swapping of animals for other animals or other valuable consideration between individuals; authorization of health care, shots, and immunization by veterinarians and other care providers; the shipping and transportation of animals between various locations by workers, shippers, or transporters; identifying individuals claiming to have an interest in or control over an animal, (e.g., ownership, power of attorney, guardianship, etc.); exchanges between individuals and boarding facilities (e.g., ranches, dairies, stables, kennels, etc.); exchanges between individuals and slaughterhouses and food processing facilities, etc.

In each of the above situations, the certainty in the validity and finality of the animal transaction depends not only on the proper identification of the animal, but also on the proper identification of the person or persons in the animal identity and tracking chain that are involved in the animal transaction and claiming to have an interest in or control over the animal or animals.

The present invention is also directed to an integrated system and method which integrate an iris acquisition of one or more animals with the iris acquisition of one or more persons in order to identify the animal, identify the person, and authenticate a match in the identity and tracking chain between the animal and the person thereby ensuring certainty as to the validity and finality of various animal transactions.

FIG. 13 is an exemplary integrated flow diagram of an exemplary animal identification, person identification, identity and tracking chain authentication, and animal transaction authorization process. The system and method are adapted for the identification of one or more animals, for the identification of one or more persons, for matching the animal identification to the person identification, and for authorizing an animal transaction based on the results of the identifications and the match between the identified animal and the identified person in the animal identity and tracking chain.

Preferably, the system and method include one or more databases having stored iris images of both humans and animals enrolled in a particular application. The database can include one of a plurality of remote local servers, or preferably, a central database. The database is preferably located at a central station maintained by a controlling or governing authority, or custodian. Preferably, the iris database allows near real time retrieval of stored iris images.

Because the iris of an animal is generally not as rich (e.g., random) as the iris of a human, the animal iris images are preferably keyed to, or associated with, one or more person's iris images in the database. This helps facilitate the identification of an animal and also the matching of the animal to a person.

As shown in FIG. 13, an operator desiring to verify the identity of a person (or to enroll the person in an identification database) obtains an image of the iris of the person as follows. An imager, similar to imager as described above with reference to FIGS. 2 through 11, is used at step 920 to illuminate at least one eye, and thus the iris, of the person. An image of the iris is obtained at step 925. At step 930, it is determined whether the image is suitable for further processing and comparison, as described above. If the image is not suitable, the appropriate indicators are activated at step 935, and processing returns to step 925 with the capture of another iris image.

If the captured image is suitable for further processing, the image is processed at step 940 to extract an IRISCODE™ template. Preferably, the template comprises a 512-byte code for example. Optionally, an indicator can be activated to alert the operator that a suitable image has been captured. The extracted image is transmitted to a database at step 940, where the image is compared at step 945 to a stored template residing in the database. The database can include one of a plurality of remote local servers, or preferably, a central database. If the iris template is invalid, meaning that no match was found during the comparison at step 945, then two options are available to the operator. The person identification process may be terminated at step 950, or alternatively, the operator may enroll the person at this time.

If the iris template is valid, meaning that a match between the captured image and the stored images during the comparison at step 945, then the identity of the person has been authenticated (e.g., confirmed). Authentication can be indicated by an audible or visual indication.

Once the person has been properly identified, the animal identification and the matching of the animal to the person begin at step 955. Again, an operator desiring to verify the identity of an animal (or to enroll the animal in an identification database) obtains an image of the iris of the animal in a similar process as was used to verify the identification of the person. An imager is used at step 955 to illuminate at least one eye, and thus the iris, of an animal. An image of the iris is obtained at step 960. At step 965, it is determined whether the image is suitable for further processing and comparison, as described above. If the image is not suitable, the appropriate indicators are activated at step 970, and processing returns to step 960 with the capture of another iris image.

If the captured image is suitable for further processing, the image is processed at step 975 to extract an animal iris template. Optionally, an indicator can be activated to alert the operator that a suitable image has been captured. The extracted image is transmitted to a database at step 975, where the captured animal image is compared to stored animal templates residing in a database. If the captured animal iris template is invalid, meaning that no match was found during the comparison at step 980, then two options are available to the operator. The animal identification process may be terminated at step 985, or alternatively, the operator may enroll the animal at this time.

If the iris template is valid, meaning that a match between the captured animal image and the stored animal images during the comparison at step 980, then the identity of the animal has been authenticated (e.g., confirmed). Authentication can be indicated by an audible or visual indication.

Once the animal identification and the person identification have been authenticated, the person's identification and the animal's identification are compared at step 990 to see if the person is identified as an authorized person in the identity and tracking chain for that animal. If a transaction authorization (e.g., a match) is not found between the person and the animal, then several options are available at step 995. The operator can key the person to the animal (e.g., place a pointer in the database between the animal template and the person template), or alternatively, the operator can terminate the process and no authorization is given to complete the animal transaction.

If a match is found, then the person is authenticated as an authorized person in the animal identity and tracking chain for that animal, and authorization to complete the animal transaction is given at step 997. Authorization can be indicated by an audible or visual indication, or can include an electronic or paper document memorializing the animal transaction and authorization. A unique authorization code can be sent from the processor at the central database to the processor at the remote server or handheld imager.

FIG. 14 shows an exemplary animal identification, tracking, and authorization system 5 in accordance with the present invention for use with, for example, the cattle industry. As shown in FIG. 14 animals are enrolled into a database 22 or server 18, preferably using a ruggedized, wireless, battery operated handheld imager 100, such as the PCIris™ manufactured by IriScan of Marlton, N.J. The imager 100 is coupled to the local server 18 using a wired or wireless connection for transmitting one or more iris templates. The enrollment data 20 can also be transmitted to a central database 22. The local server 18 and/or the central database 22 can contain identification information, as shown in data field 19, relating to an animal, including the iris template (e.g., the IRISCODE™) of the animal, a photograph of the animal, shot and immunization records, information relating to blood and DNA samples, etc. The enrollment can be performed after birth or during the weaning period of the animal. Preferably, the enrollment and the capturing of the iris image are performed after the iris of the particular animal has become stable.

In addition to identification information relating to the animal, identification information relating to a person or persons in the identity and tracking chain for a particular animal can also be enrolled in the system 5. In the exemplary cattle industry shown in FIG. 14, people in the animal identity and tracking chain can include the owner of the animal, farms with subsidies 30, slaughterhouses and food processing plants 35, transportation points, shippers, and persons involved in the transportation and handling of the cattle 40, veterinarians and other care providers responsible for vaccination, drug administration, and general health care of an animal 45, etc. Each of these parties involved in the animal identity and tracking chain can be keyed to the iris template and other biometric data of the animal.

For example, birthing enrollment data is keyed to the iris templates of the owner, animal, and DNA sample. Farms with subsidies 30 can be keyed to the iris templates of owners and animals, slaughterhouses 35 can be keyed to the iris templates for handlers, owners, and animals, transportation points 40 can be keyed to the iris templates of drivers, owners and animals, veterinarians and drug administrators 45 can be keyed to the iris templates of approved veterinarians and animals, etc.

This information can be stored at one or more local server 18, or preferably, in a centralized database 22, as shown. Preferably the central database 22 is controlled by a governing body within the industry. The local servers 18 can be coupled to the central 10 database 22 via standard wireless or wired connections. The database can contain other identification information relating to the animal and/or the person, such as name, age, markings, breed, race, etc., as well as authority levels or other entitlements, such as right of ownership, right to sell the animal, right to transport the animal, right to treat the animal, right to give shots to the animal, power of attorney, right to engage in a commercial activity involving the animal, etc. This information could be stored in the central database, or may be stored in a separate database or memory device that is pointed to by the central database once the identity of the animal and person have been authenticated.

The system 5 can allow real-time authentication of the identity of the animal and the identity of a person requesting permission to conduct a transaction involving the particular animal. The identification process involves using an imager 100 to obtain an image of an iris of an eye. The imager can be the same type image described above in the enrollment process. The imager 100 can be connected to a processor 46, such as a personal computer, which can in turn be coupled to a local server 18 via a standard wireless or wired connection.

Once a template of the animal's iris and the person's iris are obtained by the imager 100, the central database 22 can be accessed by the local server 18 and the captured images compared to stored images in the central database 22. The system checks whether the animal's captured image template matches a stored animal image template and the person's captured image template matches a stored human image template, and whether the animal's image template is associated with or linked to the person's image template (e.g., the animal image template and the person image template are cross-referenced in the database to see if they have been keyed to point to one another or have been associated with one another). If the animal is successfully identified, the person is successfully identified, and an association e.g., a match) is found between the animal and person, then the animal transaction is authorized. An authorization code can be sent from the central database or local server to the person requesting the animal identification and transaction authorization.

Figure 15A:
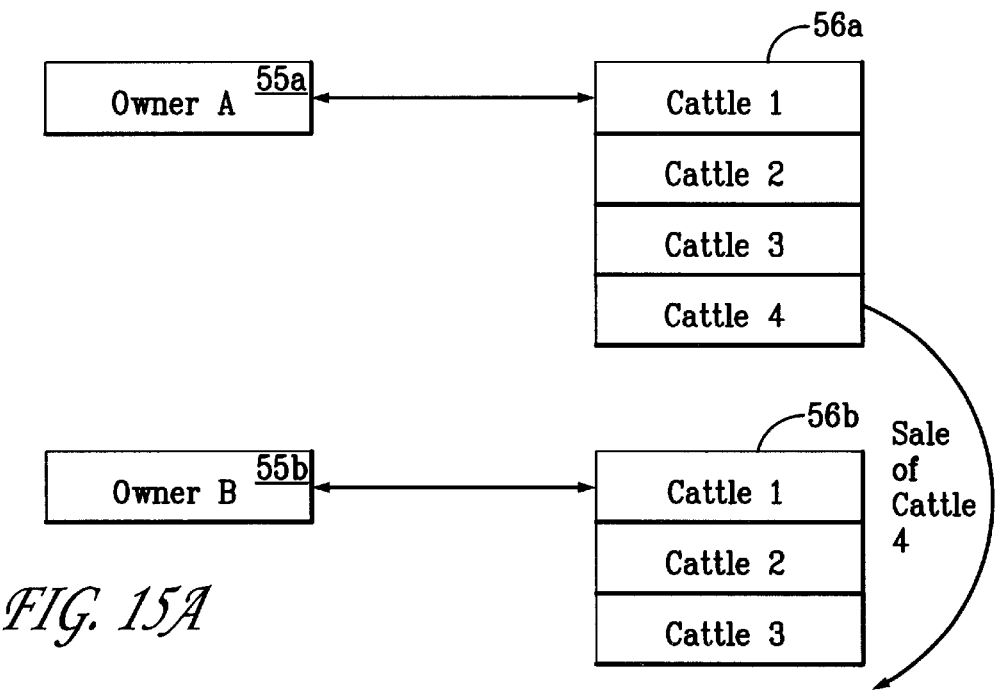
FIGS. 15A and 15B are schematic diagrams of exemplary data fields showing the association of identification data for one or more animals to the identification data of one or more people.
Figure 15B:
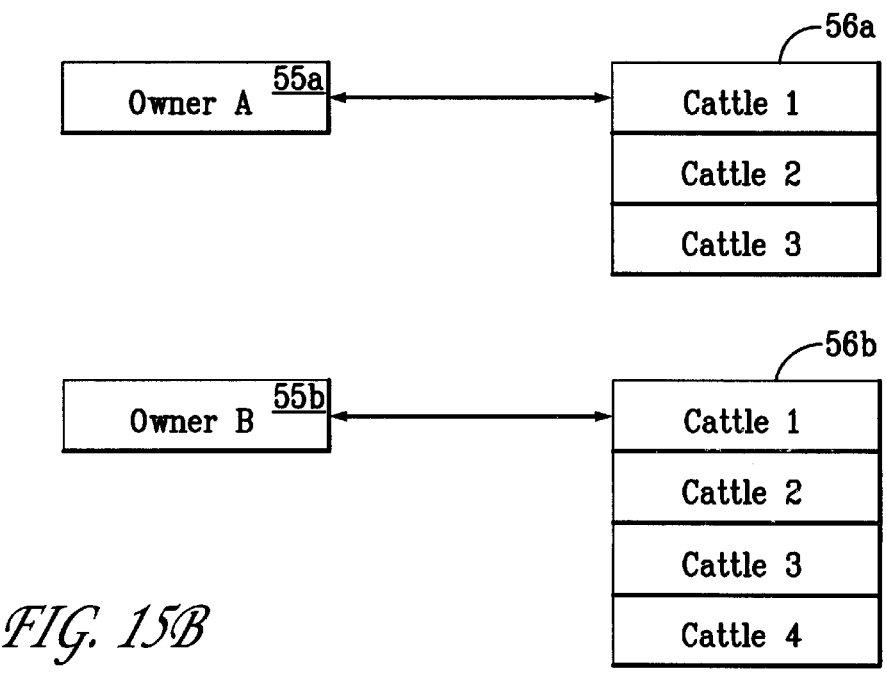

As shown in FIGS. 15A and 15B, one or more animals, such as cattle, are preferably associated in the database with, for example, the owner of those animals. The owner's identification information 55a, 55b can be used as a pointer in the database to the animal identification information 56a, 56b associated with a particular owner, as shown in FIG. 15A. When an owner, such as owner A, sells an animal, such as cattle 4 to another person, such as owner B, then the identification information relating to cattle 4 is manipulated within the database to be associated with its new owner, owner B, as shown in FIG. 15B.

Preferably, the identification data relating to an animal or animals is partitioned in the database based on the identification data for one or more persons associated with that animal or animals. Accordingly, the stored iris images can be moved around or reassigned as a result of a completed animal transaction.

An example of the use of the invention in the cattle meat industry would work as follows. A person takes one or more cattle to a slaughterhouse and attempts to sell the cattle. Theft of the cattle and fraud on the slaughterhouse can be avoided by requiring the persons attempting to sell the cattle to the slaughterhouse to prove ownership of or legal authority over the cattle using the animal identification and transaction authorization system. If the person is not registered in the central database as the owner of the particular cattle presented at the slaughterhouse, then the slaughterhouse would not purchase the cattle and the appropriate authorities could be notified. If the person and the animal are identified and matched in the database, authorization to complete the sale of the animal to the slaughterhouse is given. The ownership of the animal is transferred based on authentication of the identifications, and there is no need to physical brand or mark the animal.

Another example of the use of the invention is in the horse racing business. The identity of the horse running in a particular race is very important considering the large sums of money wagered during horse races. If a person could disguise the true identity of a horse, he could stand to profit as a result of his fraud and deception. For example, a person could claim to enter a horse that is not expected to perform well in the race, thereby increase the betting odds on that horse. If the person were allowed to fraudulently enter another horse with superior racing ability than the horse he claims to have entered, then the person could benefit from his fraud. The use of the animal identification and transaction authorization system could prevent this type of fraud by authenticating the identity of each horse at the gate prior to the start of the race.

The system and method provide a non-invasive, accurate, and reliable means for the tracking and identification of owners and animals. The system and method would include a value-added service (e.g., animal tracking and identification) for a fee. Exemplary business models contemplated to be within the scope of the invention include: generation of registration and enrollment fees for people in the animal identity and tracking chain, such as the owners of large animals used for food; annual subscription fees for everyone in the animal identity and tracking chain, such as veterinarians, farmers, ranchers, etc.; transaction fees for people who need the identity of the animal and/or the owner verified; in the case of racing animals, racetracks would pay a fee and the race would not be run until the local server acknowledges the identity of each animal entered at the gate; in the case of cattle, slaughterhouses would pay a fee to check the identity of every owner and every animal that arrives to verify the proper animal showed up, that the proper drugs had been administered by approved veterinarians, and that the owner or shipper that presents the animal is in fact the owner of the animal or a person authorized to have the animal.

Although illustrated and described herein with reference to certain specific embodiments, it will be understood by those skilled in the art that the invention is not limited to the embodiments specifically disclosed herein. Those skilled in the art also will appreciate that many other variations of the specific embodiments described herein are intended to be within the scope of the invention as defined by the following claims.

What is claimed is:

1. An iris imaging system for obtaining an image of an iris of an eye of an animal and for obtaining an image of an iris of an eye of a person for animal identification and animal transaction authorization, comprising:

one or more iris acquisition devices for obtaining an image of an iris of at least one animal eye and at least one human eye;

a processor for extracting at least one template from said obtained animal iris image and for extracting at least one template from said obtained human iris image;

a first memory for storing at least one template of at least one image of an iris of at least one animal eye and for storing at least one template of at least one image of an iris of at least one human eye;

a second memory having stored animal iris image templates and stored human iris image templates previously obtained by an iris acquisition device; and a comparator for comparing said at least one obtained animal template to said stored animal templates to identify said animal, for comparing said at least one obtained human template to said stored human templates to identify said person, and for determining a match between said obtained animal iris template and said obtained human iris template.

2. The iris imaging system according to claim 1, said one or more iris acquisition devices comprising:

a lens having an image plane disposed in front of a front surface of said iris acquisition device;

a mirror disposed on a side of said lens opposite said iris acquisition device;

an illuminator disposed along a side of said mirror; and an activator to begin iris image acquisition.

3. The iris imaging system according to claim 1, wherein said stored animal iris image is associated with said stored human iris image.

4. The iris imaging system according to claim 3, wherein said association comprising one or more pointers between said stored animal iris template and said stored human iris template.

5. The iris imaging system according to claim 1, wherein authorization to perform an animal transaction is based on said match between said animal iris template and said human iris template.

6. The iris imaging system according to claim 1 further comprising an authorization code fed back to said processor based on a signal from said comparator.

7. A method of animal identification and animal transaction authorization responsive to an iris of an animal and an iris of a person, comprising:

(a) storing image information of an iris of an eye of one or more animals;

(b) illuminating an eye of an unidentified animal having an iris;

(c) obtaining an image of said iris of said unidentified animal;

(d) determining if said image is an image of sufficient quality for a step (f) of extracting;

(e) repeating steps (b) through (d) until said image of sufficient quality is obtained;

(f) extracting an iris template, if said image is of sufficient quality;

(g) comparing said iris template of said obtained animal iris image with said stored animal image information to identify said unidentified animal;

(h) storing image information of an iris of an eye of one or more persons;

(i) illuminating an eye of an unidentified person having an iris;

(j) obtaining an image of said iris of said unidentified person;

(k) determining if said image is an image of sufficient quality for a step (m) of extracting;

(l) repeating steps (i) through (k) until said image of sufficient quality is obtained;

(m) extracting an iris template, if said image is of sufficient quality;

(n) comparing said iris template of said obtained image with said stored person image information to identify said unidentified person;

(o) matching said identified animal to said identified person to authenticate said identified person is in an animal identity and tracking chain for said identified animal; and (p) authorizing a transaction involving said animal responsive to a result of said step of matching.

8. The method according to claim 7, wherein said matching said animal to said person further comprises keying at least one of said stored iris templates to point to at least one other stored iris template.

9. The method according to claim 7, wherein said authorizing said transaction involving said animal further comprises generating an authorization code if said iris template of said animal substantially matches said stored image information and said animal iris template is matched to said person iris template.

10. The method according to claim 9, wherein if said authorizing a transaction, further comprising billing against an identity of said person in said animal identity and tracking chain.

11. The method according to claim 7, further comprising developing an identification marker containing one or more of an iris template of said animal, an iris template of a person in said animal's identity and tracking chain, and one or more of a biometric characteristic and identification information of said animal.

12. The method according to claim 7, further comprising generating registration/enrollment fees to be paid by one or more persons in said identity and tracking chain of said animal.

13. The method according to claim 7, further comprising charging an annual subscription fee to be paid by one or more persons in said identity and tracking chain for said animal.

14. The method according to claim 7, further comprising generating a transaction fee based on a requestor of identification information relating to said animal or said person in said animal identity and tracking chain.

15. The method according to claim 7, wherein said storing image information of an iris of an eye of one or more animals comprises storing said image information in one of a central database and a plurality of remote local servers.

* * * * *

UNITED STATES PATENT AND TRADEMARK OFFICE
CERTIFICATE OF CORRECTION

PATENT NO.   : 6,424,727 B1
DATED        : July 23, 2002
INVENTOR(S)  : Clyde Musgrave et al.

It is certified that error appears in the above-identified patent and that said Letters Patent is hereby corrected as shown below:

<u>Title page,</u>
Item [56], FOREIGN PATENT DOCUMENTS, the following documents should be listed:
-- PCT WO    97/46980    12/11/97
   PCT WO    97/46979    12/11/97
   PCT WO    97/46978    12/11/97
   PCT WO    97/21188    06/12/97
   PCT W0    98/08439    03/05/98
   PCT WO    98/32093    07/23/93 --

<u>Column 22,</u>
Line 11, the number "10" appears and should not.

Signed and Sealed this

Twenty-eighth Day of October, 2003

JAMES E. ROGAN
*Director of the United States Patent and Trademark Office*